US008565090B2

(12) United States Patent
Mateos Perez et al.

(10) Patent No.: US 8,565,090 B2
(45) Date of Patent: Oct. 22, 2013

(54) METHOD FOR DISTRIBUTING MESSAGES TO DESTINATION NODES BY USING LATENCY AND CONGESTION METRICS

(75) Inventors: Daniel Mateos Perez, Getafe (ES); Jesus Solana Gonzalez, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 714 days.

(21) Appl. No.: 12/811,571

(22) PCT Filed: Jan. 9, 2008

(86) PCT No.: PCT/EP2008/050179
§ 371 (c)(1),
(2), (4) Date: Jul. 2, 2010

(87) PCT Pub. No.: WO2009/086932
PCT Pub. Date: Jul. 16, 2009

(65) Prior Publication Data
US 2010/0278046 A1  Nov. 4, 2010

(51) Int. Cl.
*H04L 12/26*   (2006.01)
(52) U.S. Cl.
USPC ............ 370/235; 370/237; 370/238; 370/401
(58) Field of Classification Search
None
See application file for complete search history.

(56) References Cited

U.S. PATENT DOCUMENTS

| | | | |
|---|---|---|---|
| 2001/0052016 A1 | 12/2001 | Skene et al. | |
| 2002/0056010 A1* | 5/2002 | Lincoln et al. | 709/247 |
| 2002/0071391 A1* | 6/2002 | Ishioka | 370/238 |
| 2004/0019726 A1* | 1/2004 | Kelley et al. | 710/305 |
| 2009/0109854 A1* | 4/2009 | Rajpathak | 370/238 |
| 2013/0121152 A1* | 5/2013 | Tanaka et al. | 370/235 |

* cited by examiner

*Primary Examiner* — Ian N Moore
*Assistant Examiner* — Tito Pham

(57) ABSTRACT

In the method of the invention, messages received by a message distributor are distributed to destination nodes. The method includes an optional procedure for obtaining a congestion metric of each of the at least two destination nodes, and a procedure for obtaining a latency metric of each of at least two destination nodes. The latency metric of a destination node includes a measure of a transmission time between the message distributor and the destination node. The method further includes a procedure for computing destination weights of each of the at least two destination nodes by taking into account the congestion metric, if obtained, and the latency metric of each of the at least two destination nodes; and a procedure for selecting as a destination for a received message one of the at least two destination nodes, depending at least on the destination weights.

16 Claims, 23 Drawing Sheets

| | Congestion level 0-1 | Congestion level 2-3 | Congestion level 4-5 | Congestion level 6-8 |
|---|---|---|---|---|
| Low latency | 10 | 8 | 6 | 4 |
| Medium latency | 8 | 6 | 4 | 2 |
| High latency | 6 | 4 | 2 | 1 |

|  | Congestion metric category CMC1 | Congestion metric category CMC2 |
| --- | --- | --- |
| Latency metric category LMC1 | $DW_{11}$ | $DW_{12}$ |
| Latency metric category LMC2 | $DW_{21}$ | $DW_{22}$ |

Fig. 9a

|  | Congestion level 0-1 | Congestion level 2-3 | Congestion level 4-5 | Congestion level 6-8 |
| --- | --- | --- | --- | --- |
| Low latency | 10 | 8 | 6 | 4 |
| Medium latency | 8 | 6 | 4 | 2 |
| High latency | 6 | 4 | 2 | 1 |

Fig. 9b

METHOD FOR DISTRIBUTING MESSAGES TO DESTINATION NODES BY USING LATENCY AND CONGESTION METRICS

TECHNICAL FIELD

The present invention relates to a method for distributing messages received by a message distributor to at least two destination nodes. It also relates to a message distributor for carrying such a method, and to a system, a home location register (HLR) and a home subscriber server (HSS) including such a message distributor. It also relates to a computer program configured, when carried out on a computer, such as a message distributor, to carry out the above method.

BACKGROUND

In telecommunications and data networks, the need for scalability within a network infrastructure arises when the memory or processing capacity within one or more network nodes is no longer sufficient to cope with a growth in usage of the network node or nodes. In other words, it is often necessary to provide scalability in a monolithic or distributed system, by increasing the memory or processing capacity of the system, e.g. by adding a network node. A need for carrying out such a task in an easy and efficient manner exists.

The same need arises when a decrease in usage of a network node occurs. That is, it may be required to be able to easily and efficiently decrease the memory or processing capacity of a system, e.g. by removing a network node, in order to reduce the maintenance costs associated with the system.

Adding a node to expand the capacity of a distributed system or removing one to reduce the maintenance costs is often accompanied by a need for manually reconfiguring the central node in charge of distributing the load amongst the processing nodes, especially when the nodes do not present the same characteristics, in terms of processing or memory capacity.

It is therefore desirable to provide a method which solves or partially solve the above-mentioned problems of providing convenient scalability in a distributed system.

SUMMARY

Such a method is provided by claim 1. Advantageous embodiments are described in the dependent claims.

In one embodiment of the method, requests received by a message distributor are distributed to at least two destination nodes. The method includes a congestion metric obtaining procedure for obtaining a congestion metric of each of the at least two destination nodes. The method further includes a latency metric obtaining procedure for obtaining a latency metric of each of at least two destination nodes, wherein the latency metric of a destination node includes or may include, or is or may be derived from, a measure of a transmission time between the message distributor and the destination node, and may additionally include as well a measure of the time from receiving a message and handling it, i.e. processing it, by the destination node. The method yet further includes a destination weight computing procedure for computing destination weights of each of the at least two destination nodes by taking into account the congestion metric and the latency metric of each of the at least two destination nodes. Moreover, the method includes a destination node selecting procedure for selecting, by the message distributor, as a destination for a received message one of the at least two destination nodes, depending at least on the destination weights.

The method provides for the routing or distribution of messages by a message distributor based on a combination of both latency and congestion metrics associated with the destination nodes. The method enables to cope with a distributed system having destination nodes presenting heterogeneous and dynamic characteristics. This will be explained in more details below.

A message may for instance be a request received from a network node through a telecommunications or computer network. A message may be in the form of a data packet. It may represent a request for obtaining a piece of data, such as subscriber information, a request for obtaining authentication data relating to a user attempting to access a network, or a request for establishing a session within the framework of providing a service.

A message distributor may be a server computer configured for receiving messages from a telecommunication or data network and further configured to distribute the messages, in accordance with particular criteria, to destination nodes.

The destination nodes may be server computers configured for receiving messages from the message distributor and for handling these messages. The handling may include querying a database and sending back a response to the client unit from which the message originates or to another unit configured to handle the response. The destination nodes may be database modules as well, where said messages are corresponding database queries.

Generally speaking, a message distributor is not necessarily adjacent to each destination node and all the aspects of the present invention may be applied where a number of intermediate nodes are connected in the signalling path between the message distributor and any destination node. In this case, both latency and congestion metrics may be calculated as respective measures through the whole signalling path between the message distributor and each destination node.

A congestion metric of a destination node is a measure of how busy a destination node is, notably in the process of handling messages. The congestion metric of a destination node may for instance be, at a particular time, the number of messages currently handled divided by the available processing capacity. It may alternatively or also include a measure of the time from receiving a message and handling it, i.e. processing it, by the destination node, i.e. a queuing time. In particular, a congestion metric may individually refer to different layers that the destination node might comprise, such as OSI layers, or may globally refer to the whole node where a certain layer reaches a certain congestion level or in accordance with other criteria.

A congestion metric may be or may be similar to a congestion level as defined in section "2. Terminology" of the IETF draft draft-asveren-dime-cong-02.txt. See T. Asveren, V. Fajardo, IETF, *Diameter Congestion Signaling*, draft-asveren-dime-cong-02.txt, Jun. 15, 2007. Alternatively, the congestion metric may be as explained in the recommendation Q.714 of the International Telecommunication Union (generally known as ITU).

A latency metric of a destination node is a measure of a transmission time of a packet or signalling message between the message distributor and the destination node. It may be the transmission time from the moment at which the message distributor sends a packet or signalling message to the moment at which the destination node receives it, i.e. a one-way latency. It may also be or depends on the round-trip time from the message distributor to the destination node, i.e. the sum of the transmission time needed for a packet or signalling message to go from the message distributor to the destination node and the transmission time for the packet or signalling message to go from the destination node back to the message distributor. It may further be an average value of a plurality of measured one-way transmission time values, or an average value of a plurality of measured round-trip transmission time values, or an average value of a combination of a plurality of both transmission time values, or a value derived thereof.

The latency metric of a destination node may also be a measure of a transmission time of a packet or signalling message between the message distributor and the destination node, wherein the transmission time is the transmission time of a packet or signalling message only on a segment or more than one segment of the path between the message distributor and the destination node.

A round-trip transmission time can be measured from a single point, i.e, from the message distributor or from the destination node. In contrast, a one-way transmission time may require synchronization of the clocks of the destination node and the message distributor.

The latency metric, if obtained from a round-trip transmission time, may be computed and obtained at the occasion of sending a message from the message distributor to the destination node. This may be done by calculating the difference between the time when the message is sent and the time when an acknowledgment response is received. The acknowledgement response should be sent by the destination node as soon as it receives the message, so that the latency metric is independent from the internal processing load and queuing time of the destination node. Such latency metric obtained through this particular procedure may be usable for the next packet or signalling message to be distributed.

In other words, the round-trip transmission time may exclude the time used by a destination node to process the packet or signalling message in cases where the acknowledge is submitted before having processed the packet or signalling message, and may include the time used by a destination node to process the packet or signalling message where the acknowledge is submitted after having processed the packet or signalling message. In one embodiment, the round-trip transmission time excludes the time used by a destination node to process the packet or signalling message and is distinct from the congestion metric, to enable fine-tuning with respect to heterogeneous and dynamic characteristics of the distributed system and the destination nodes.

The round-trip transmission time may be obtained in a similar manner as a service called ping that can be used to measure round-trip latency. This type of service is provided by many existing software platforms and is known by skilled persons. This type of utility performs no packet processing, but only returns a response when it receives a packet. It is therefore a relatively accurate way of measuring latency.

For the sake of simplicity, the terms "packet" and "message" may be used in the following to equivalently represent packet, signalling message, or any compacted piece of information, unless otherwise outlined.

For improved precision, a one-way latency metric may be obtained as the time from the start of packet transmission to the start of packet reception. This latency metric does not depend on the link throughput and the packet size, and is the minimum transmission delay through the link.

A destination node may be a node responsible of data storage, such as storage of subscriber data within a mobile communication support network. A destination node may for instance be a database or directory system usable to store data conventionally held at a home location register (HLR) or an authentication center (AUC) in a GSM architecture, or a home subscriber server (HSS) in an IP multimedia subsystem (IMS) architecture. A skilled person will recognize the characteristics of a GSM architecture, and those of an IP multimedia subsystem (IMS) architecture, the latter being suitable as an architectural framework for providing Internet protocol (IP) multimedia services to users.

The distributed messages may form part of a process of exchanging requests and accessing data, including storing and maintaining a user or subscriber session.

The term "obtaining" herewith covers the operations of receiving mostly passively, being notified of, requesting mostly actively, or any combination of passive, notification-based and active operations.

The method of the invention is advantageous in that the distribution of messages generally results in a reduction of the overall message latency and network congestion within the distributed system, and therefore improves its overall responsiveness.

For instance, messages may be exchanged between the message distributor, herewith also called load distributor (LD), and a destination node, which may be a home subscriber server front end (HSS-FE) unit. A home subscriber server front end (HSS-FE) unit performs the business or control logic consisting in handling the messages and is arranged in front of the data logic in charge of storing data, as explained below. As a technical effect of using the method of the invention, most of such exchanges may tend to occur with the destination nodes being the closest ones to the message distributor, wherein "closest" means closest in terms of transmission time, processing time, or both. This may reduce the amount of messages sent to destination nodes which are far away from the message distributor, wherein "far away" means reachable through communication links having long transmission time, processing time, or both. Therefore, if, in one example, some of the destination nodes are arranged inside a local network including the message distributor while other destination nodes are arranged outside the local network, the number of messages sent outside the local network may be reduced. As a result, the outside network may handle less traffic and the allocated bandwidth resources thereto may be reduced.

The method of the above-described embodiment uses both latency and congestion metrics and may be applied to different network interfaces. It is not limited to a protocol based on TCP (Transmission Control Protocol) or SCTP (Stream Control Transmission Protocol). A protocol from the SIGTRAN family may be used, for instance a datagram service communication protocol such as the Signaling Connection Control Part (SCCP) User Adaptation (hereinafter SUA) layer, or the Message Transfer Part, Level 3 (MTP3) User Adaptation (hereinafter M3UA) layer. Diameter, a protocol based on the Diameter Base protocol, as defined in P. Calhoun et al, IETF RFC 3588, *Diameter Base Protocol*, September 2003, or LDAP (Lightweight Directory Access Protocol) may also be used. The method may be implemented in any of them.

The distribution of messages in the method of the above-described embodiment offers improved global efficiency in the process of handling messages while adapting to changing network conditions. More messages may be sent to the destination nodes having low latency metrics, i.e. those being close in terms of transmission times to the message distributor, while fewer messages may be sent to the destination nodes having high latency metrics. The processing load of the destination nodes is also taken into account.

More messages may be sent to the less busy destination nodes having a low congestion metric, while fewer messages may be sent to the busier destination nodes having a high congestion metric.

In particular, and suitable for instance for architectures where the congestion is not an issue for message distribution, the method of the invention may be such that it does not comprise a congestion metric obtaining procedure but does comprise a latency metric obtaining procedure, and such that the destination weights are computed without taking into account the congestion metrics but by taking into account the latency metrics. This more general method provides a simplified, yet efficient solution to the above-described problems of coping with heterogeneous and dynamic destination node configurations.

In one embodiment, the measure of the transmission time between the message distributor and the destination node is a round-trip time. This embodiment provides a simple way to obtain the latency metric, since it may be obtained from the message distributor.

In one embodiment, the latency metric of a destination node is a smoothed round-trip time. A smoothed round-trip time is for instance defined and provided in R. Stewart at el., RFC 2960, *Stream Control Transmission Protocol*, October 2000 (See in particular, but not only, section 1.5. "Abbreviations", section 6.3 "Management of Retransmission Timer", including section 6.3.1 "RTO Calculation", and sub-section "K) Get SRTT Report" in section "10.1 ULP-to-SCTP"). This is a state variable which may be retrieved, since it is already used for other purposes.

In one embodiment, the congestion metric obtaining procedure includes monitoring the congestion metric of each of the at least two destination nodes in a periodical manner or when transmitting a message to a destination node. The destination weight computing procedure includes computing the destination weights when any one of the congestion metrics changes.

This embodiment enables to monitor in an efficient manner the congestion metric of each destination node to provide up-to-date destination weights, i.e. corresponding to the actual network situation and conditions. The monitoring may be carried out asynchronously with respect to the normal message flow and periodically (for example, by means of any kind of heartbeat), or at the occasion, or as a consequence, of sending a message to a destination node.

In one embodiment, the latency metric obtaining procedure includes monitoring the latency of each of the at least two destination nodes in a periodical manner or when transmitting a message to a destination node. The destination weight computing procedure includes computing the destination weights when any one of latency metrics changes.

In a similar manner as for the previously described embodiment, this embodiment provides efficient monitoring and up-to-date destination weights. Monitoring may be performed asynchronously with respect to the usual message flow, e.g. in a periodical manner, or at the occasion of sending a message to a destination node.

The two above embodiments providing monitoring of the congestion and latency metrics respectively avoid the need for manually configuring the routing parameters of the message distributor. A dynamic adaptation of the destination weights in a periodic manner or reactively, i.e. in reaction to the transmission of a message, is provided. These embodiments provide for automatically re-computing and updating the destination weights used by a message distributor in the destination node selecting procedure, in the event that e.g. the number of destination nodes to which the traffic needs to be distributed changes. The message distributor should be notified of the addition of a destination node. In contrast, the disconnection or removal of a destination node need not necessarily be notified to the message distributor. This is because the method provides for automatically monitoring changes to the latency metric associated with a destination node, and thus the disconnection of a destination node may be automatically recognized.

In one embodiment, at least two congestion metric categories are provided and each congestion metric value is associated with one congestion metric category. At least two latency metric categories are also provided and each latency metric value is associated with one latency metric category. Furthermore, a destination weight is associated with each pair of a congestion metric category and a latency metric category. In this embodiment, the destination weight computing procedure includes obtaining the congestion metric category with which the congestion metric of each of the at least two destination nodes is associated, obtaining the latency metric category with which the latency metric of each of the at least two destination nodes is associated, and obtaining for each of the at least two destination nodes the destination weight associated with its pair of congestion metric category and latency metric category.

This provides a simple and efficient way to compute the destination weights, by classifying possible metric values into respective metric categories. In one embodiment, a metric category is defined as a range of metric values.

A routing table including destination weights may therefore be generated by associating with each destination node a weight based on another table made up of columns corresponding to congestion metric categories, and rows corresponding to latency metric categories. Each intersection of a column and a row corresponds to a pair of congestion metric category and latency metric category and is associated with a destination weight.

The routing table may be used for each message received by the message distributor. Subsequent messages belonging to already ongoing processes may be directly routed to the previously selected destination nodes. The method may be such that it does not interfere with that process. In other words, the distribution based on destination weights, i.e. the destination node selecting procedure, may be performed for only some of the received messages, i.e. the messages initializing a process or session.

In one embodiment, the destination node selecting procedure includes selecting each of the at least two destination nodes in turn a number of times depending on its destination weight. The number of times for a destination node may be proportional to its destination weight.

This provides an efficient way to distribute and to instantly, or at least quickly, scale the distribution of messages, without the need for computing again respective percentages or proportions of messages to be sent to each destination node. The duration, in terms of number of messages, of the distribution cycle is also automatically adapted.

The invention further consists in a message distributor configured for receiving messages and for distributing them to at least two destination nodes. The message distributor includes a latency metric obtaining unit, a destination weight computing unit and a destination node selecting unit. The latency metric obtaining unit is configured for obtaining a latency metric of each of at least two destination nodes, wherein the latency metric of a destination node includes a measure of a transmission time between the message distributor and the destination node. The destination weight computing unit is configured for computing destination weights of each of the at least two destination nodes by taking into account the latency metric of each of the at least two destination nodes. The destination node selecting unit is configured for selecting as a destination for a received message one of the at least two destination nodes, depending at least on the destination weights.

In one embodiment, the message distributor further includes a congestion metric obtaining unit. In this message distributor, both latency and congestion metrics are taken into account by the destination weight computing unit for computing destination weights of each of the at least two destination nodes. The congestion metric obtaining unit is configured for obtaining a congestion metric of each of the at least two destination nodes.

The invention further consists in a system including a message distributor as described above and at least two destination nodes. The system is configured for distributing messages received by the message distributor to the at least two destination nodes.

The invention further consists in a home location register including a message distributor as described above. It further consists in a home subscriber server including a message distributor as described above.

The invention further consists in a computer program configured, when carried out on a computer, such as a message distributor, to carry out the method as described above.

BRIEF DESCRIPTION OF THE DRAWINGS

Embodiments of the present invention shall now be described, in conjunction with the appended figures, in which:

FIG. 9a schematically illustrates a table including congestion metric categories and latency metric categories for computing destination weights in one embodiment of the invention;

FIG. 9b schematically illustrates an example of a table including congestion metric categories and latency metric categories in one embodiment of the invention;

DETAILED DESCRIPTION

The present invention shall now be described in conjunction with specific embodiments. It may be noted that these specific embodiments serve to provide the skilled person with a better understanding, but are not intended to in any way restrict the scope of the invention, which is defined by the appended claims.

Figure 1:
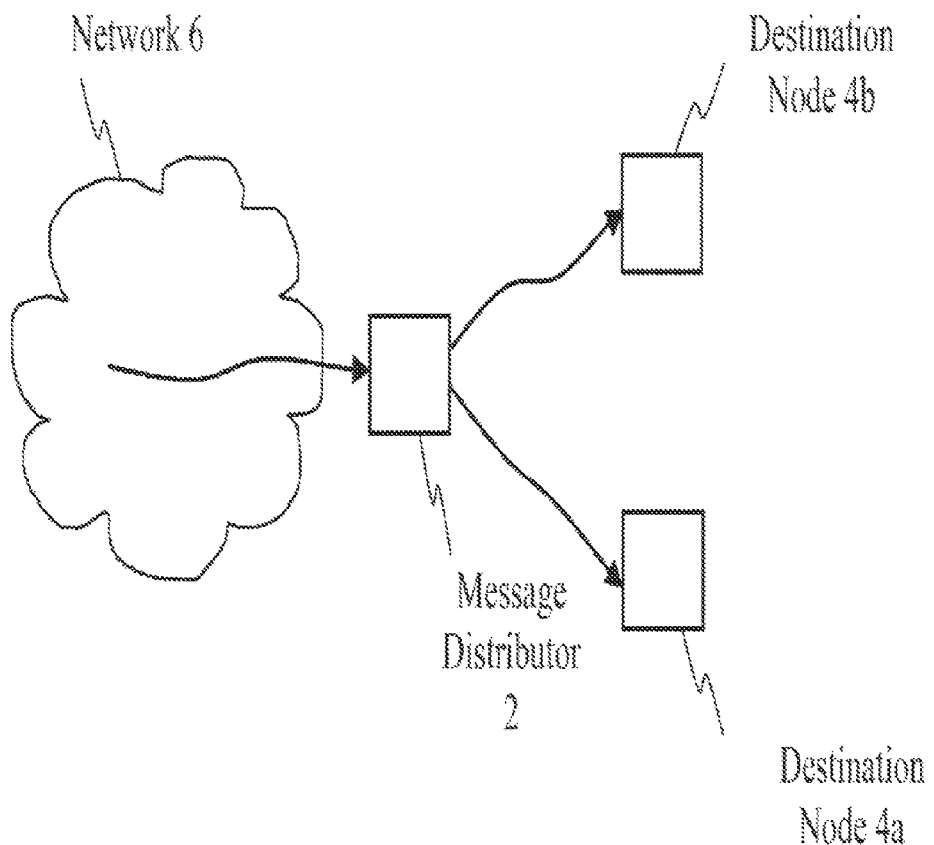
FIG. 1 schematically illustrates an embodiment of a network configuration wherein a method according to the invention is carried out.

FIG. 1 schematically represents an embodiment of an architecture wherein a method of the invention may be performed.

In this architecture, a message distributor 2 is configured to receive messages from a network 6. The arrow reaching the message distributor 2 and coming from the network 6 illustrates the transmission of messages and their reception by a message distributor 2. The messages originate directly or indirectly from one or more client terminals (not shown on FIG. 1). The client terminals are able to be connected to at least one network and able to send messages to the message distributor 2. The message distributor 2 is connected to the network 6 and able to receive messages transmitted from the network 6.

The message distributor 2 is configured to distribute the received messages to one of the destination nodes 4a, 4b. Only two destination nodes 4a, 4b are represented in FIG. 1, but more than two destination nodes 4a, 4b may be provided. Their number is not limited.

A message distributor 2 is a computer entity configured for receiving messages from a network 6 and for distributing the messages. A destination node 4a, 4b is a computer configured with instructions for accepting messages, handling them and optionally sending back responses. Distributing messages to destination nodes 4a, 4b means sending each one of the messages to at least one destination node 4a, 4b. In one embodiment, the distribution of messages is implemented by sending each one of the messages to only one destination nodes 4a, 4b. In another embodiment, some of the messages or all messages are sent to more than one destination node 4a, 4b.

The destination nodes 4a, 4b may be functionally homogeneous or not. If the destination nodes 4a, 4b are not functionally homogeneous, some of them may be specialized destination nodes. For instance, a group of specialized destination nodes may be dedicated to a particular task or set of tasks, by being provided with a particular infrastructure, rights, database accesses, or adapted security software or hardware configurations. Specializing destination nodes 4a, 4b may be advantageous to concentrate required software or hardware on certain destination nodes and to relieve other destination nodes from having such specialized software or hardware configurations or equipments. Particular policies for handling the messages may also be implemented on some destination nodes depending on which type of messages these destination nodes are configured to handle.

In other words, the destination nodes 4a, 4b may either be heterogeneous or homogeneous with respect to their internal architecture, capacity, functionality, etc.

The destination nodes 4a, 4b may or may not be tightly coupled, may or may not trust each other, may or may not be able to directly communicate with each other, and may or may not be geographically dispersed.

In one embodiment, the destination nodes 4a, 4b are connected to the message distributor 2 through a local area network (LAN) or a storage area network (SAN) so as to be able to efficiently receive messages from the message distributor 2. Some of the destination nodes 4a, 4b may however be located relatively far from the message distributor 2, e.g. on a remote network.

In one embodiment, the message distributor 2 is a home location register (HLR). In another embodiment, the message distributor 2 is a home subscriber server (HSS). The skilled person will recognize that a home location register (HLR) is a central database containing details of each mobile phone subscriber authorized to use a GSM and/or WCDMA core network. The skilled person will also recognize that a home subscriber server (HSS) is a similar storage entity in an IP Multimedia Subsystem (IMS). The invention is however not limited to a particular communication protocol or architecture.

Once a message has been sent to a particular destination node 4a, 4b, the configuration may be static, i.e. the following exchanges of messages in the same session may be carried out with the same destination node 4a, 4b.

Figure 6:
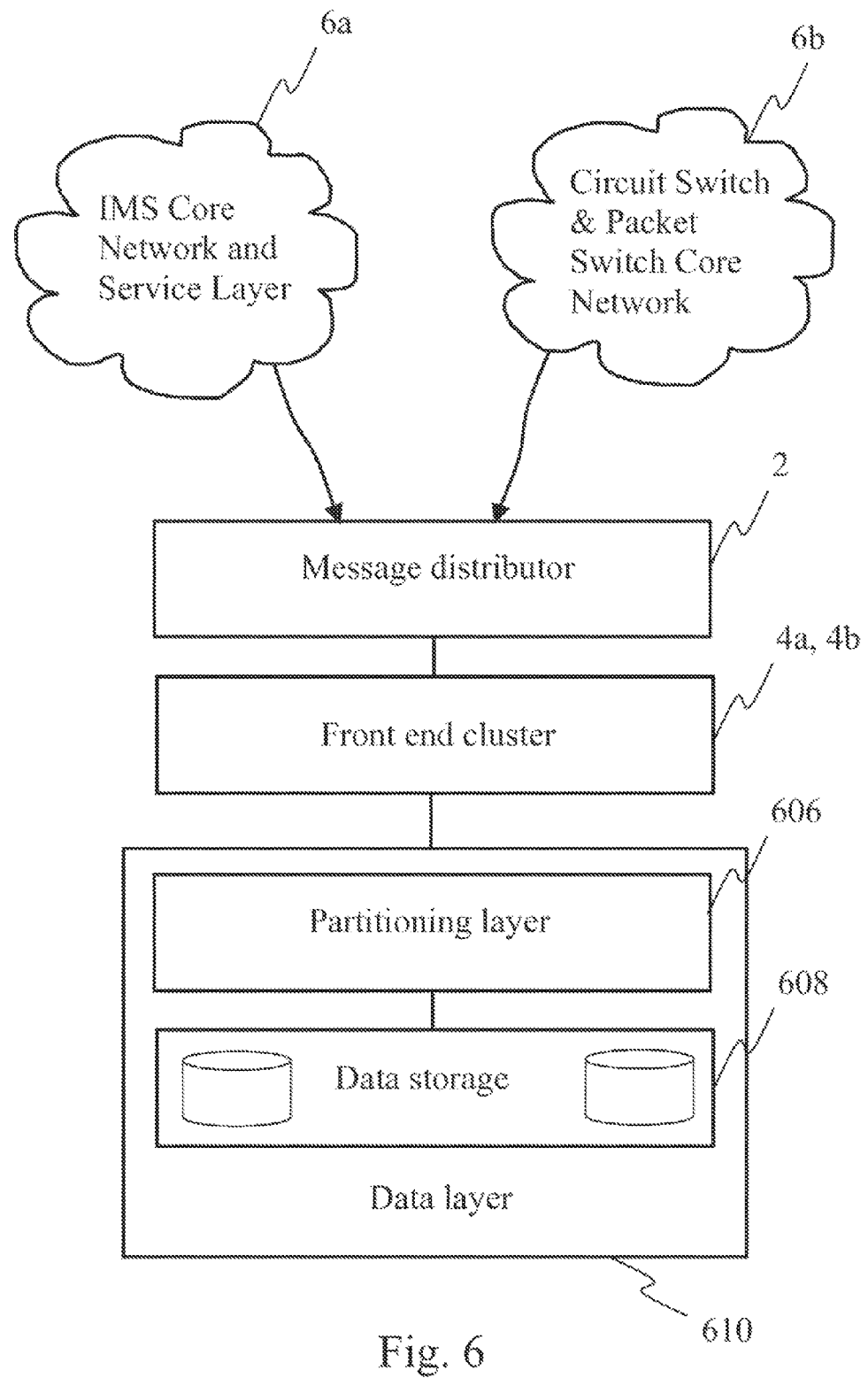
FIG. 6 illustrates an exemplary network configuration in which one embodiment of a method according the invention is applied.
Figure 10:
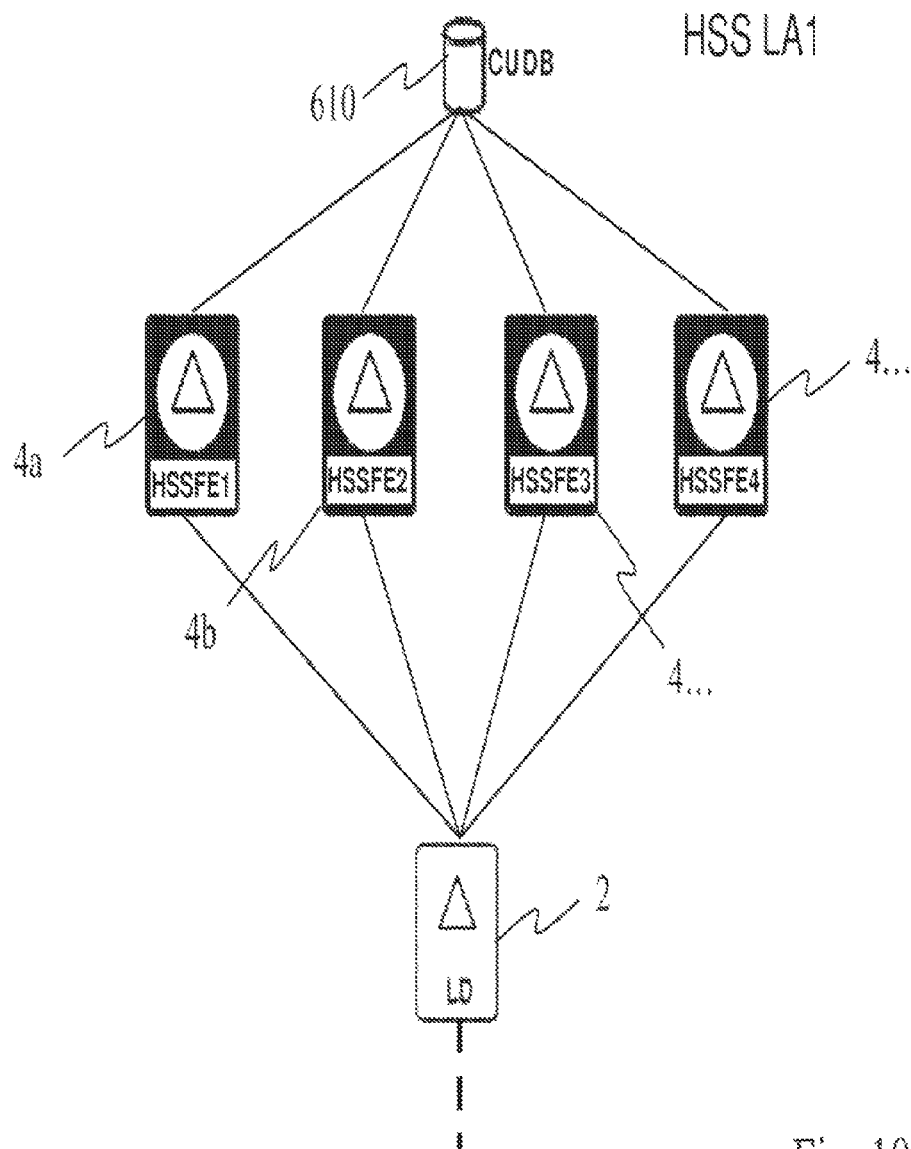
FIG. 10 schematically illustrates a network configuration of a home subscriber server (HSS) arranged in a layered, distributed architecture in one embodiment of the invention.

The destination nodes 4a, 4b may themselves access to a common node, such as a common database 610 (referring to FIGS. 6 and 10 illustrating examples).

The message distributor 2 has the following functions. It obtains and stores the current congestion metric values of each one of the destination nodes 4a, 4b. It obtains and stores the current latency metric values toward each destination node 4a, 4b. It computes the destination weight of each of the destination nodes 4a, 4b based on the congestion metric values and latency metric values. Moreover, it applies the routing (or selecting) rules based on the destination weights. In other words, it selects as a destination for each received message one of the destination node 4a, 4b depending on the destination weights (in the destination node selecting procedure 18). It further updates the routing rules, i.e. the destination weights, when the pool of destination nodes 4a, 4b changes, and when the characteristic of a destination node 4a, 4b changes.

For example, let us take a home location register (HLR) being a distributed system, such as a distributed layered architecture (DLA). Such home location register (HLR) includes a message distributor 2 and at least two destination nodes 4a, 4b. When using SIGTRAN (SUA or M3UA based solution) between a message distributor 2 and the destination nodes 4a, 4b, the latency metric may be based on the SCTP (Stream Control Transmission Protocol) parameter called smoothed round-trip time (SRTT). This parameter measures the time between an SCTP message is sent and the acknowledgement is received. It is defined in RFC 2960 for SCTP (above-referred, with particularly relevant passages mentioned) and may be used whenever an initial message belonging to a new process is sent towards each destination node 4a, 4b from the message distributor 2.

In one embodiment, only initial messages are routed using the distribution method of the invention. Subsequent messages belonging to the same dialogue may be sent to the same destination node 4a, 4b or home location register front end (HLR-FE) because the process or session is maintained in that destination node 4a, 4b.

When using SUA (SCCP (Signaling Connection and Control Part) User Adaptation), this parameter is obtained directly from SCTP and routing may be based on the Global Title Translation plus the smoothed round-trip time (SRTT) (Global Title Translation + SRTT) (the Global Title Translation is defined in SS7, i.e. Signaling System #7) or only based on smoothed round-trip time (SRTT) plus the congestion towards destination node 4a, 4b fetched by means of SUA SCON (SS7 Signalling Congestion State) message.

In case of M3UA (MTP (Message Transfer Part) Level 3 User Adaptation Layer), SCCP (Signaling Connection and Control Part) on top may be adapted to receive the SRTT parameter from M3UA, which directly fetches it from SCTP. Then SCCP may handle the smoothed round-trip time (SRTT) parameter in the SCCP routing tables. Similarly as in the SUA case, routing may be based on Global Title Translation plus the smoothed round-trip time (SRTT) (Global Title Translation + SRTT) or only based on smoothed round-trip time (SRTT) plus the congestion towards destination node 4a, 4b which, in this case, may be fetched by means of SCCP SSC (SCCP/Subsystem Congestion) message. A SSC message is a SS7 Management message indicating that the SCCP in a given node or Signalling Point (SP) has reached the indicated congestion level for signalling traffic purposes.

In case of a home subscriber server (HSS), the Diameter protocol may fetch the smoothed round-trip time (SRTT) parameter from either SCTP or TCP to calculate latency towards each destination nodes 4a, 4b, which may be home subscriber servers front ends (HSS FES) implementing the business logic of the home subscriber server (HSS) arranged in front of the data layer 610 (see FIG. 6).

In order to obtain congestion of Diameter destination peer, the concepts described in IETF draft draft-asveren-dime-cong-02.txt may be used (above referred). See in particular, but not only, section 5.1. "Congestion Level Signaling Procedures" of said document.

For example, the smoothed round-trip time (SRTT) parameter is created by means of round-trip time (RTT) which is calculated inside SCTP and TCP whenever a message is sent towards a given destination node 4a, 4b.

For a home location register (HLR), the smoothed round-trip time (SRTT) parameter is requested by SUA or M3UA through SCTP. Additionally when using M3UA, this value may be transferred through SCCP. In case of home subscriber server (HSS), the smoothed round-trip time (SRTT) parameter may be requested through either SCTP or TCP by Diameter protocol.

The smoothed round-trip time (SRTT) gives the weighted round trip time for SCTP messages toward a destination. Therefore, from the smoothed round-trip time (SRTT) parameter, the relative latency from the message distributor 2 toward each destination node 4a, 4b in the pool of destination nodes 4, 4b can be derived.

From the obtained smoothed round-trip time (SRTT) value, the message distributor 2 derives an internal weighted value (e.g. 1-10) which is assigned to each destination nodes 4a, 4b (destination of the SCTP association).

How to obtain a congestion metric of a destination node 2 is herewith explained for a home location register (HLR) and a home subscriber server (HSS) (each one of them being a distributed system, such as a distributed layered architecture (DLA), including a message distributor 2 and at least two destination nodes 4a, 4b). The skilled person will be able to generalize the explanations to other distributed systems.

For a home location register (HLR), the congestion metric may be fetched by means of SCON SUA message or SSC SCOP message depending on the SIGTRAN stack used. However, for a home subscriber server (HSS), Diameter may handle congestion towards peer destination as described in IETF draft draft-asveren-dime-cong-02.txt (above referred). The procedure therein is intended to protect overloaded destination nodes 4a, 4b against further traffic being sent to them and to share the load associated with the requests or messages among multiple end points or destination nodes 4a, 4b.

If a purely latency-metric-based distribution method was used, destination nodes 4a, 4b close to the message distributor 2 might become overloaded because they are the preferred route and the preferred destination nodes 4a, 4b. Therefore, in order to not overload the less latent destination nodes 4a, 4b, the destination weights also take into account a congestion metric of each destination node 4a, 4b, based on signalling messages informing about remote congestion (SUA SCON messages, SCCP SSC management messages carried on top of M3UA and Congestion-Level AVP (attribute-value pair) in a DWR (Device-Watchdog-Req) for Diameter Base Protocol).

Figure 2:
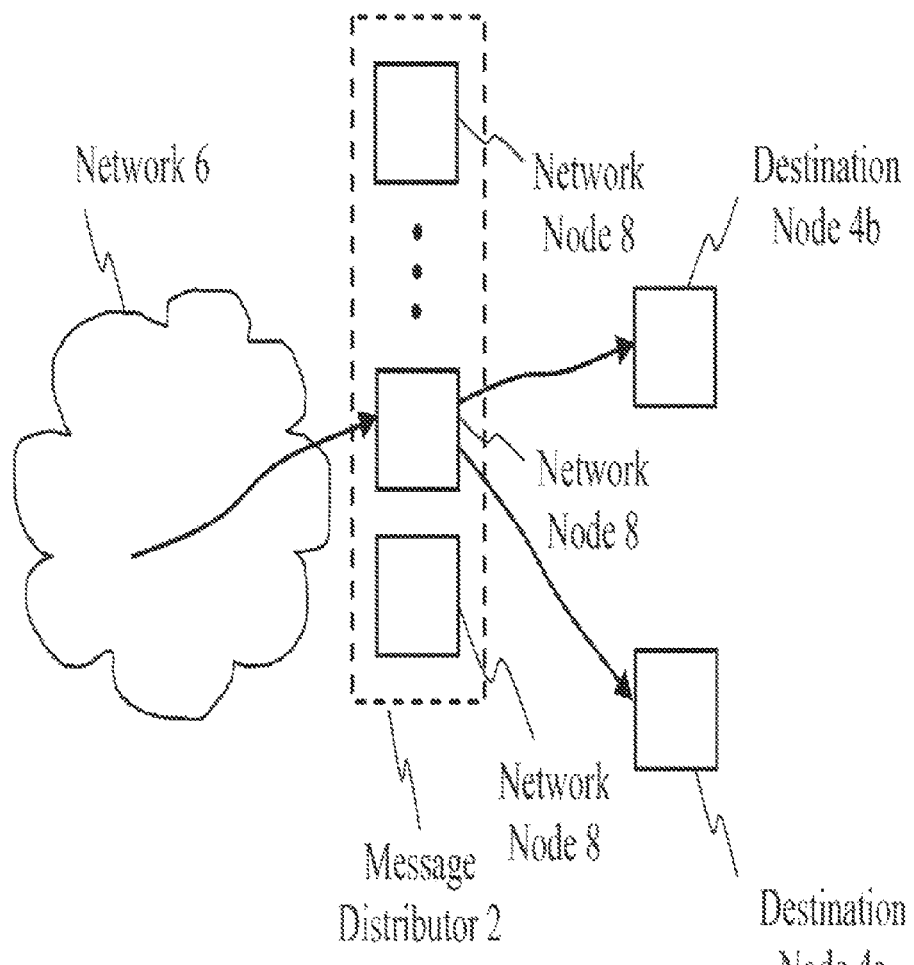
FIG. 2 schematically illustrates another embodiment of a network configuration wherein a method according to the invention is carried out, and wherein the message distributor comprises a plurality of network elements collectively configured to perform the functions of the message distributor.

FIG. 2 schematically illustrates a configuration wherein the message distributor 2 is made up of a plurality of network nodes 8, which may be at the same location or geographically dispersed.

In the embodiment illustrated in FIG. 2, the congestion metric obtaining procedure 12 and the latency metric obtaining procedure 14 may involve obtaining congestion metrics and/or latency metrics by all the network nodes 8 making up the message distributor 2.

Alternatively, the congestion metric obtaining procedure 12 and the latency metric obtaining procedure 14 may involve obtaining congestion metrics and/or latency metrics by one or some of the network nodes 8. Simplification of the message distributor 2 internal structure may be obtained by only making available the distribution information to one or some of its network nodes 8.

Alternatively, the message distributor 2 may include one network node only.

Figure 3:
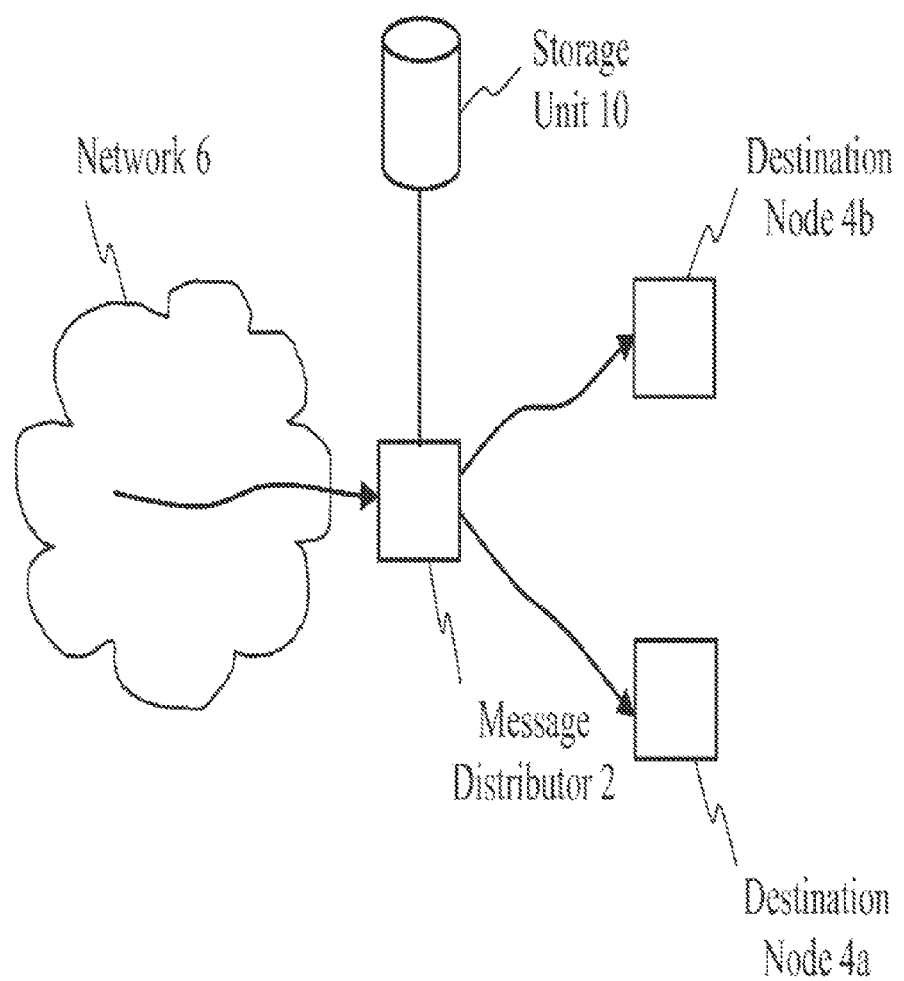
FIG. 3 schematically illustrates another embodiment of a network configuration wherein a method according to the invention is carried out, and wherein the message distributor accesses a data storage unit containing the destination weights.

FIG. 3 schematically illustrates a configuration according to one embodiment of the invention, wherein a storage means or unit 10, for instance a database, is accessible to the message distributor 2. All or a part of the congestion metrics and latency metrics obtained in the congestion metric obtaining procedure 12 and the latency metric obtaining procedure 14 by the message distributor 2 may be stored in this storage means or unit 10 for use by the message distributor 2.

Figure 4A:
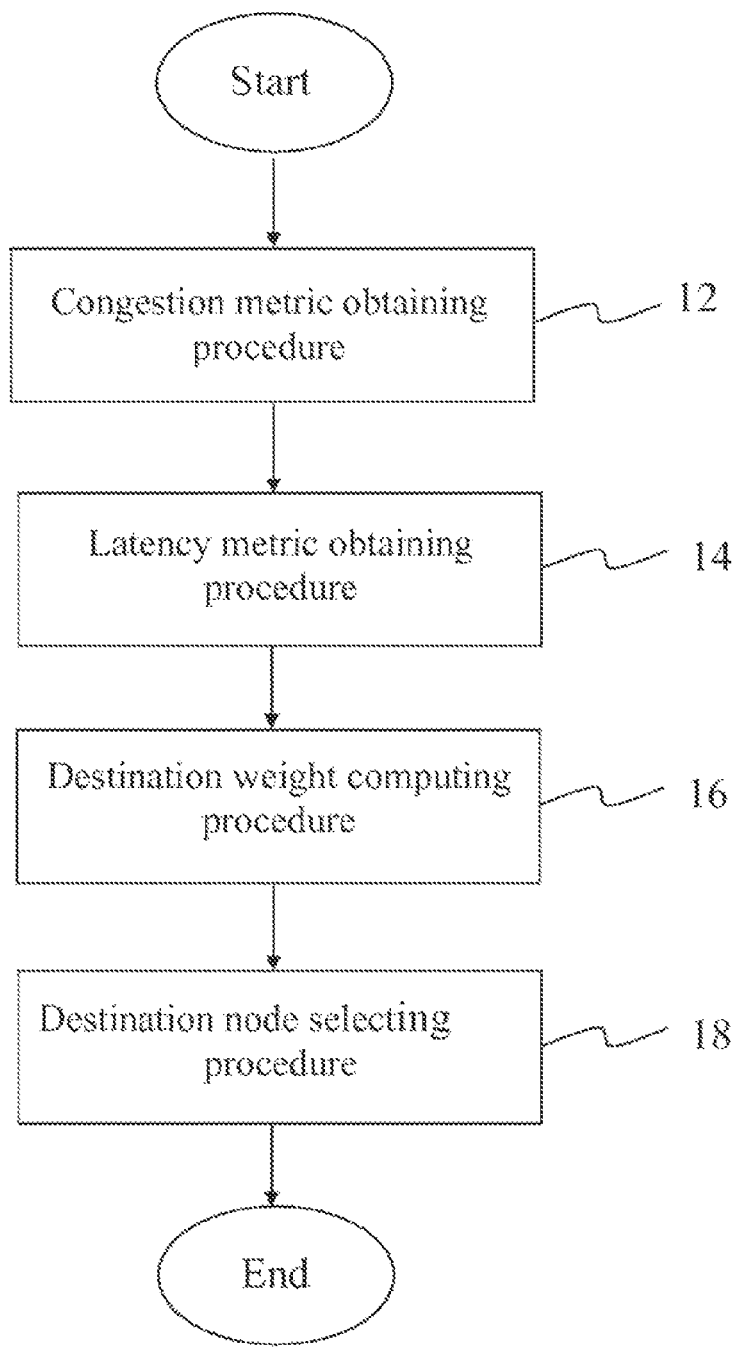
FIGS. 4a, 4b, 4c and 4d are schematic flow charts of embodiments of a method according to the invention.
Figure 4B:
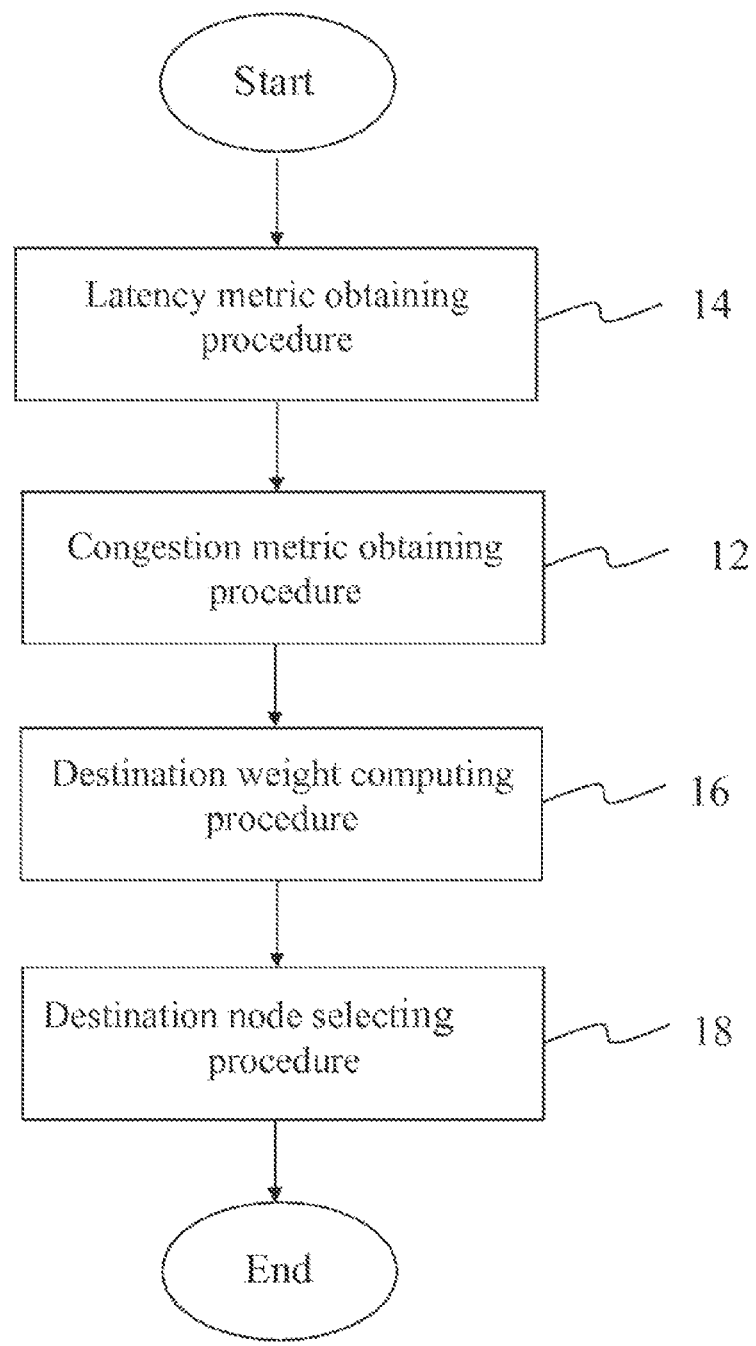
Figure 4C:
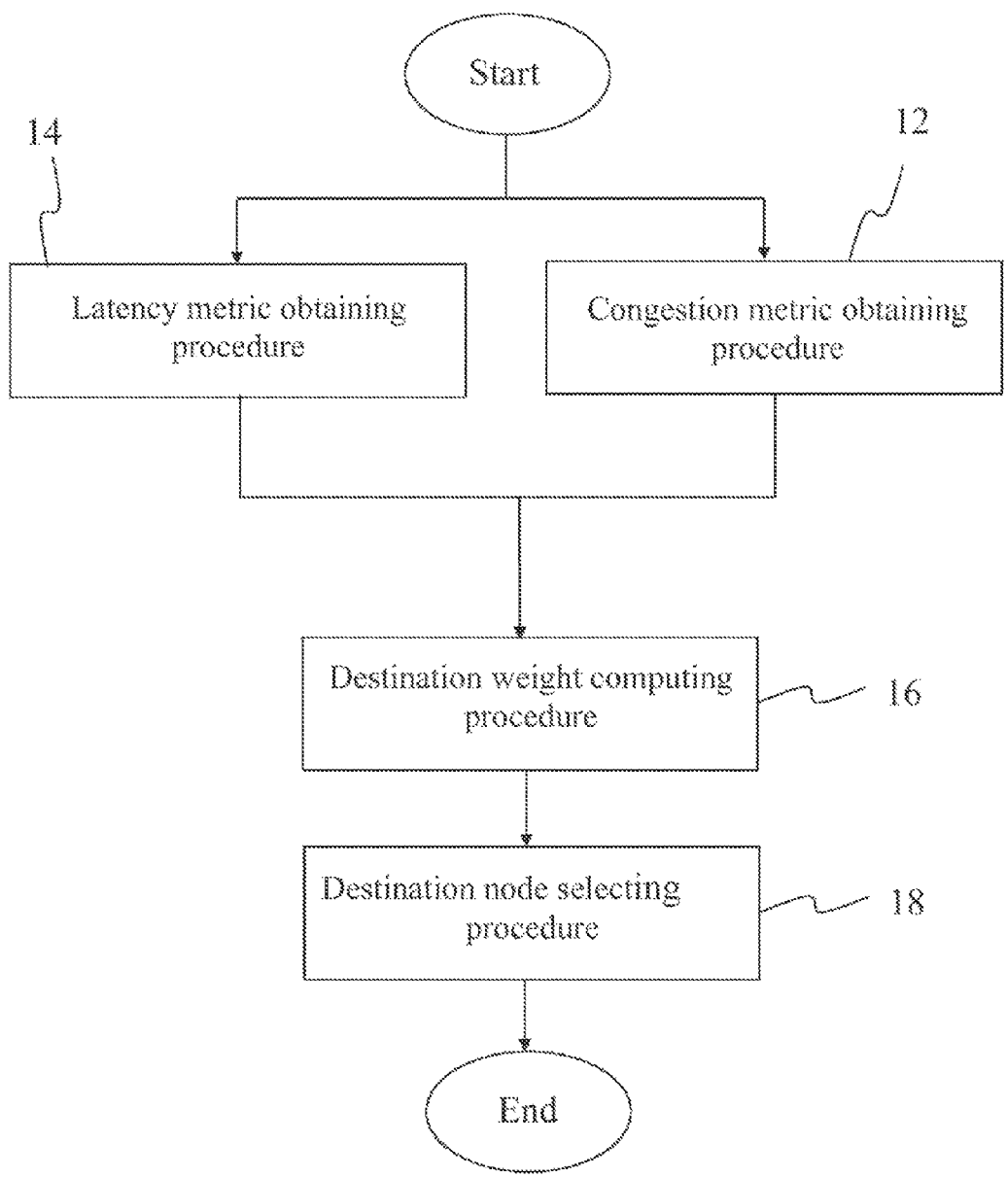

FIGS. 4a, 4b and 4c represent three flow charts of embodiments of a method according to the invention. A series of procedures are provided and are intended to be carried out consecutively.

First, a congestion metric obtaining procedure 12 provides steps and instructions to be carried out by a message distributor 2 for obtaining a congestion metric of each of the destination nodes 4a, 4b.

Then, a latency metric obtaining procedure 14 is provided for obtaining a latency metric of each of the destination nodes 4a, 4b.

The congestion metric obtaining procedure 12 and latency metric obtaining procedure 14 may be performed in parallel, i.e. concurrently (as shown in FIG. 4c), or in series, one after the other. If they are performed in series, in one embodiment, the congestion metric obtaining procedure 12 is performed before the latency metric obtaining procedure 14 (as shown in FIG. 4a) and, in another embodiment, the latency metric obtaining procedure 14 is performed before the congestion metric obtaining procedure 12 (as shown in FIG. 4b).

A destination weight computing procedure 16 is provided for computing the destination weights of the destination nodes 4a, 4b based on the congestion metric and latency metric of each of the destination nodes 4a, 4b.

The message distributor 2 selects, in the destination node selecting procedure 18, as a destination for each received message (or some of them, e.g. those with which no session is attached yet) one of the destination nodes 4a, 4b, depending on the destination weights associated with the destination nodes 4a, 4b.

Figure 4D:
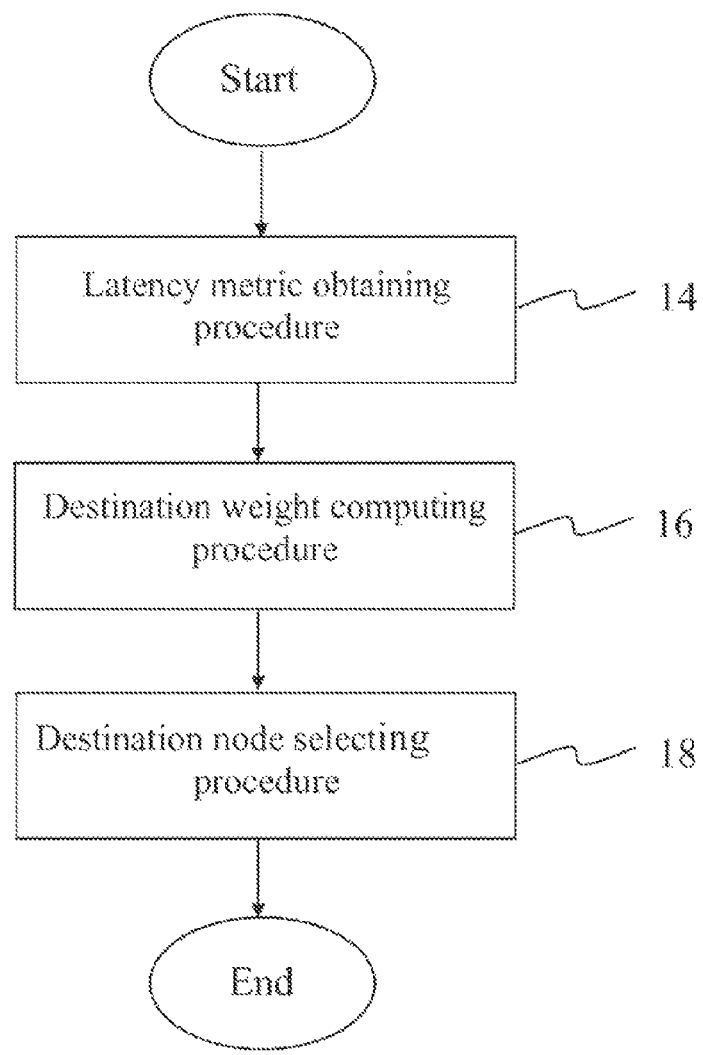

FIG. 4d represents a flow chart of an embodiment of a method according to the invention. The method illustrated in FIG. 4d differs from the methods illustrated in FIGS. 4a, 4b and 4c in that, in the method illustrated in FIG. 4d, no congestion metric obtaining procedure 12 is provided and the destination weight computing procedure 16 is such that the destination weights are computed without taking into account congestion metrics.

Figure 5A:
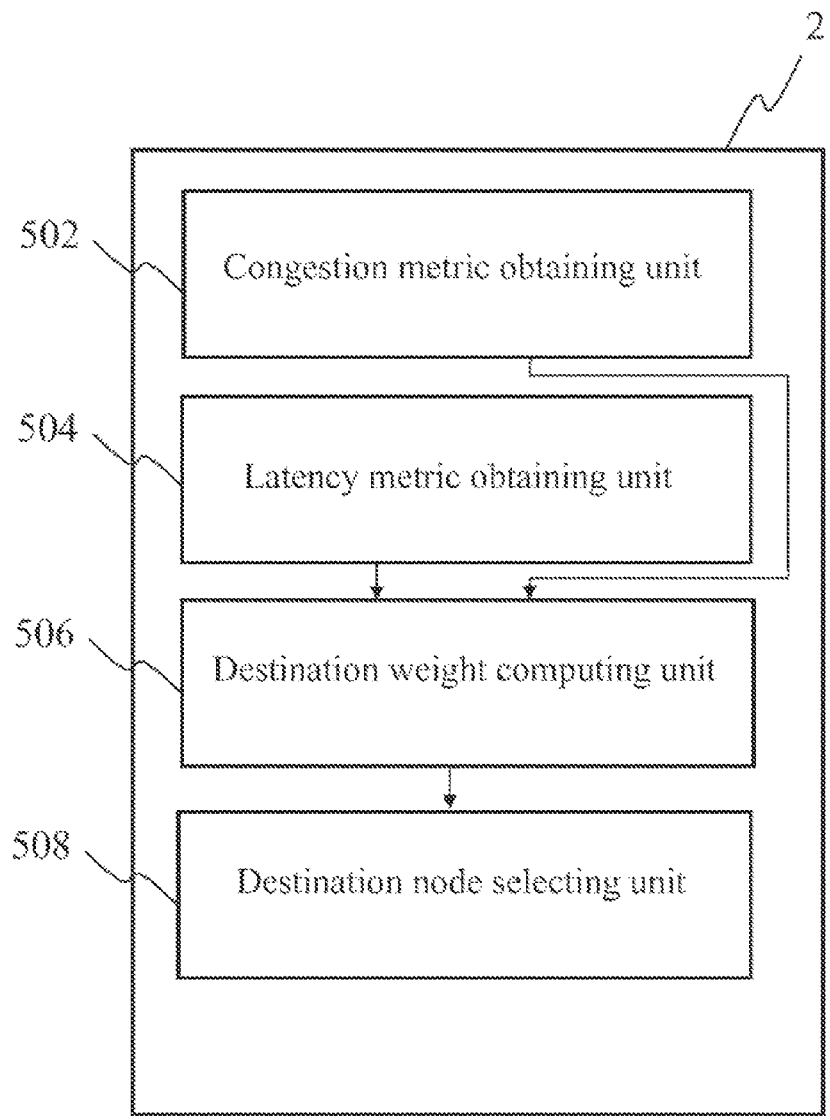
FIGS. 5a, 5b, 5c and 5d are schematic configurations of message distributors according to embodiments of the invention.

FIG. 5a schematically illustrates a message distributor 2 according to one embodiment of the invention.

The message distributor 2 includes a congestion metric obtaining unit 502 configured for obtaining a congestion metric of the destination nodes 4a, 4b. The message distributor 2 also includes a latency metric obtaining unit 504 configured for obtaining a latency metric of the destination nodes 4a, 4b. A destination weight computing unit 506 is also provided in the message distributor 2 for computing destination weights of the destination nodes 4a, 4b by taking into account the congestion metric and the latency metric of the destination nodes 4a, 4b.

The arrow originating from the congestion metric obtaining unit 502 and reaching the destination weight computing unit 506, and the arrow originating from the latency metric obtaining unit 504 and reaching the destination weight computing unit 506 illustrate that the destination weight computing unit 506 takes into account the output of the congestion metric obtaining unit 502 and the latency metric obtaining unit 504, i.e. respectively the congestion metrics and latency metrics of the destination nodes 4a, 4b.

The message distributor 2 also includes a destination node selecting unit 508 configured for selecting as a destination for a received message one destination nodes 4a, 4b, depending at least on the destination weights. The arrow originating from the destination weight computing unit 506 and reaching the destination node selecting unit 508 illustrates that the destination node selecting unit 508 takes into account, in the process of selecting a destination for a received message, the destination weights computed by the destination weight computing unit 506.

Figure 5B:
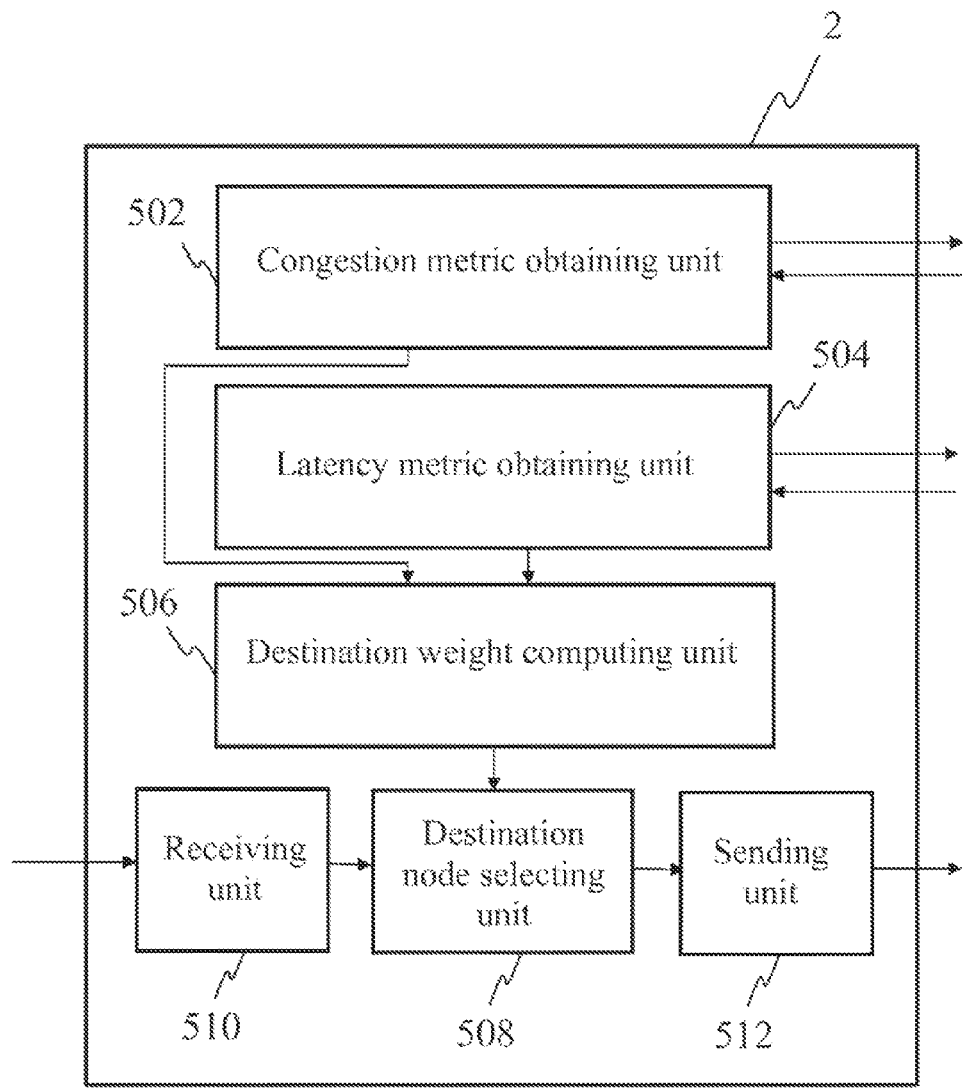

FIG. 5b schematically illustrates another embodiment of the message distributor 2 of the invention. The message distributor 2 of FIG. 5b differs from the message distributor 2 of FIG. 5a in that a receiving unit 510 and a sending unit 512 are additionally shown in the message distributor 2 of FIG. 5b.

The receiving unit 510 is configured for receiving a message, for instance from a network 6 (not shown in FIG. 5b). The sending unit 512 is configured for sending a message to one of the destination nodes 4a, 4b (not shown in FIG. 5b). An input of the sending unit 512, as illustrated by the depicted arrows, originates from the destination node selecting unit 508. In other words, the sending unit 512 sends a message received from the receiving unit 510 to a destination node 4a, 4b selected by the destination node selecting unit 508.

Although not illustrated in FIG. 5b, a message may directly be transferred from a receiving unit 510 to a sending unit 512 without transiting by the destination node selecting unit 508. The selection of the destination nodes 4a, 4b may be independent of the received message and its content.

The arrows originating from and reaching the congestion metric obtaining unit 502 and the latency metric obtaining unit 504 illustrate that both the congestion metric and the latency metric may be obtained from outside the message distributor 2. In particular, the congestion metric and the latency metric may be transmitted from each of the destination nodes 4a, 4b to the message distributor 2.

Figure 5C:
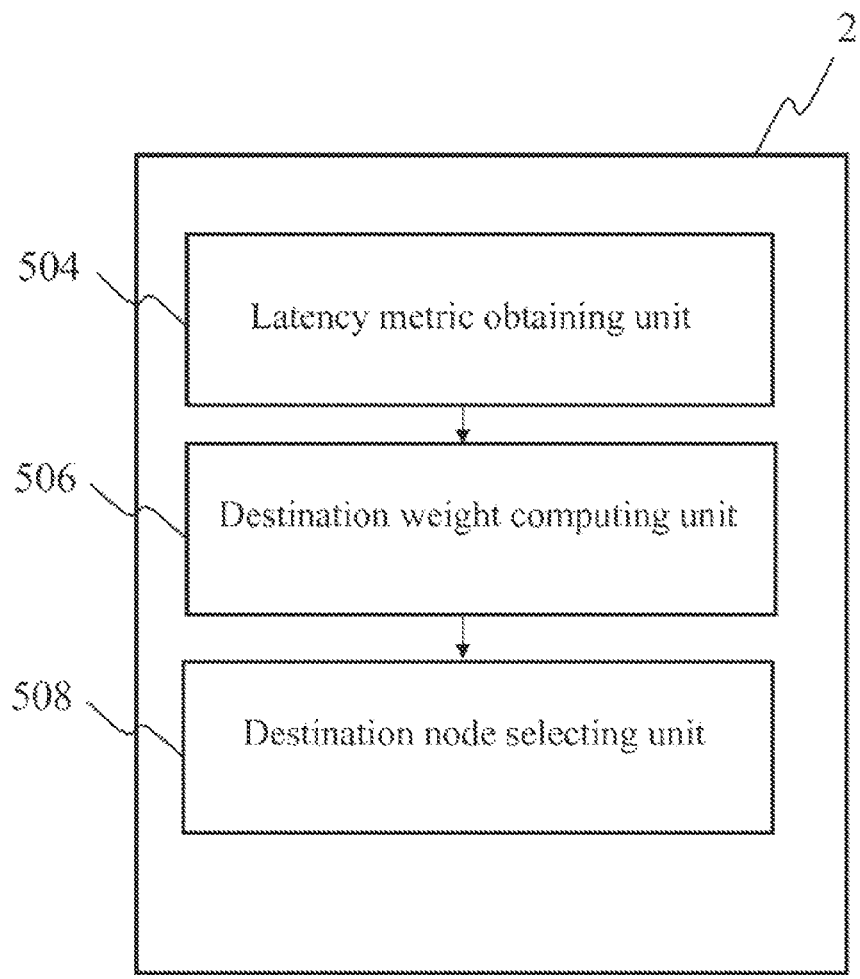
Figure 5D:
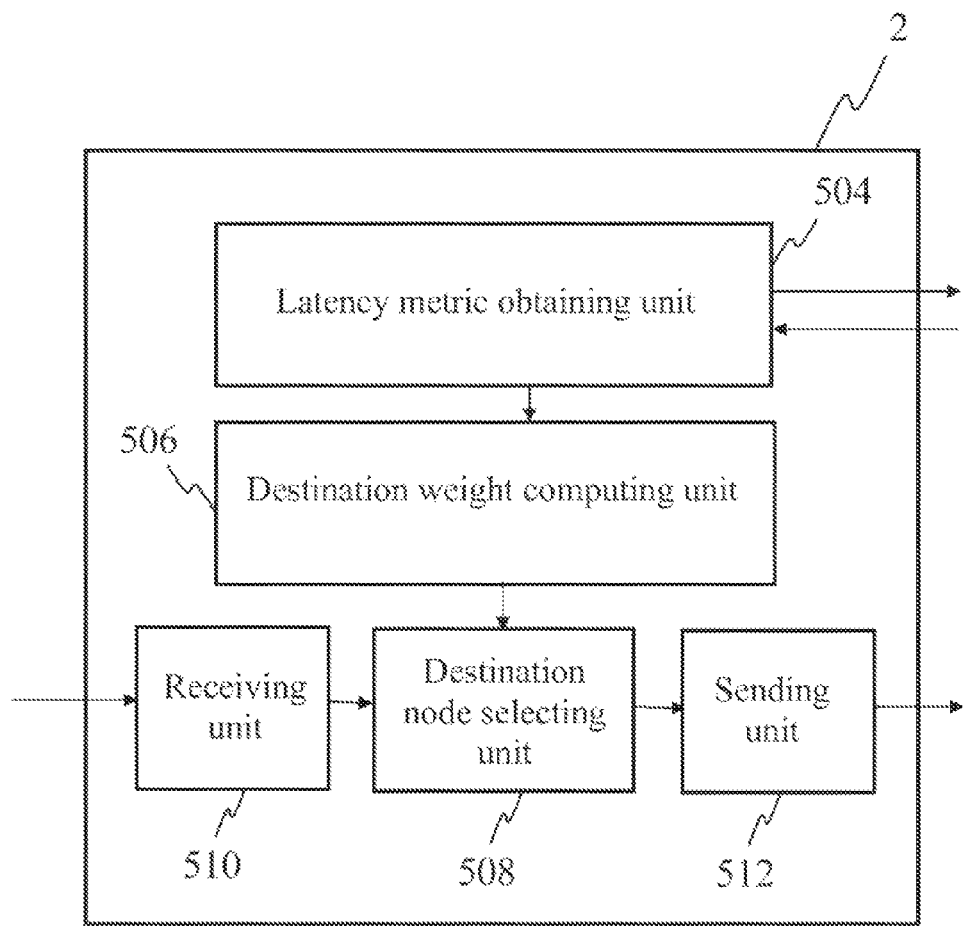

FIGS. 5c and 5d schematically illustrate two message distributors 2 according to embodiments of the invention. The message distributors 2 illustrated in FIGS. 5c and 5d differ from the ones illustrated in FIGS. 5a and 5b respectively in that, in the message distributors 2 illustrated in FIGS. 5c and 5d, no congestion metric obtaining unit 502 is provided and the destination weight computing unit 506 is configured for computing the destination weights without taking into account congestion metrics.

FIG. 6 schematically illustrates an application of the method according to one embodiment, wherein the message distributor 2 receives messages from two different networks 6: an IMS Core Network and Service Layer 6a and Circuit Switch and Packet Switch Core Network 6b. The front end cluster includes a set of destination nodes 4a, 4b, herewith also called front ends 4a, 4b. The front end cluster handles the messages received from the message distributor 2. A back end data layer 610 is also provided. It comprises a partitioning layer 606 and a data storage 608.

This layered architecture separates data from logic, so that front ends 4a, 4b generally do not store data. Only the data layer 610, embodied for instance by a common user database (CUDB), stores subscriber data. Whenever a front end 4a, 4b receives a MAP (mobile application part), INAP (intelligent network application part) or Diameter message, the first action the front end 4a, 4b performs is to download subscriber data from the CUDB, i.e. the data layer 610.

After processing the message from the network 6a, 6b, the home subscriber server front end (HSS FE) 4a, 4b may also need to update the data layer database or CUDB 610. Both profile download and update of subscriber data in the CUDB 610 may be performed by means of LDAP protocol. This architecture provides convenient scalability thanks to the possibility to use a plurality of nodes to compose each layer, especially several front ends 4a, 4b.

In other words, the home subscriber server implemented in a layered architecture (HSS LA) application is distributed on the following nodes:

1. The data layer 610 or Common User Database (CUDB), which is the building block in the architecture serving as central storage point for home subscriber server (HSS) subscriber data and other applications, so that it receives subscriber data search and updates according to traffic, provisioning and services scenarios.

2. The message distributor 2 or load distributor (LD), which distributes traffic and notification orders to the suitable front ends 4a, 4b. Usually, the message distributor 2 or load distributor (LD) offers a unique address to the outside world for the whole home subscriber server implemented in a layered architecture (HSS LA) and it is the unique point of contact to and from the outside network. This also implies that peers nodes, i.e. external nodes, are not aware, and need not be aware, about the internal HSS LA architecture.

3. The destination nodes or HSS Front End (FE) 4a, 4b are the building blocks inside the layered architecture that implement the logic of the HSS node. A front end 4a, 4b does not include the subscriber database and is adapted to interface to the data layer or CUDB 610 that keeps the subscriber profiles.

4. The partitioning layer (PL) 606, which provides data access to the front ends 4a, 4b, hiding the internal structure of the data storage 608. It is optional.

5. The data storage (DS) 608, which is subscriber data repository.

An existing monolithic home subscriber server (HSS) may evolve to a home subscriber server implemented in a layered architecture (HSS LA) which contains one message distributor 2 or load distributor (LD), and at least one destination nodes 4a, 4b or home subscriber server front ends (HSS FE). If several monolithic home subscriber server (HSS) in the network have to be substituted, then one or several home subscriber server arranged in a layered architecture (HSS LA) may be implemented (depending on the capacity needed) and each of them has one message distributor 2 or load distributor (LD), and at least one destination nodes 4a, 4b or home subscriber server front ends (HSS FE).

Even though the method of the invention may be applied to the interface between the message distributor 2 or load distributor (LD) and the destination nodes 4a, 4b or home subscriber server front ends (HSS FE), the applicability of the method may be extended to any other interfaces where a network entity 2 has to distribute messages among components 4a, 4b of a distributed entity. For instance, it may be applicable to the interface between destination nodes 4a, 4b, or home subscriber server front ends (HSS FE) and the data layer or CUDB 610.

Figure 7:
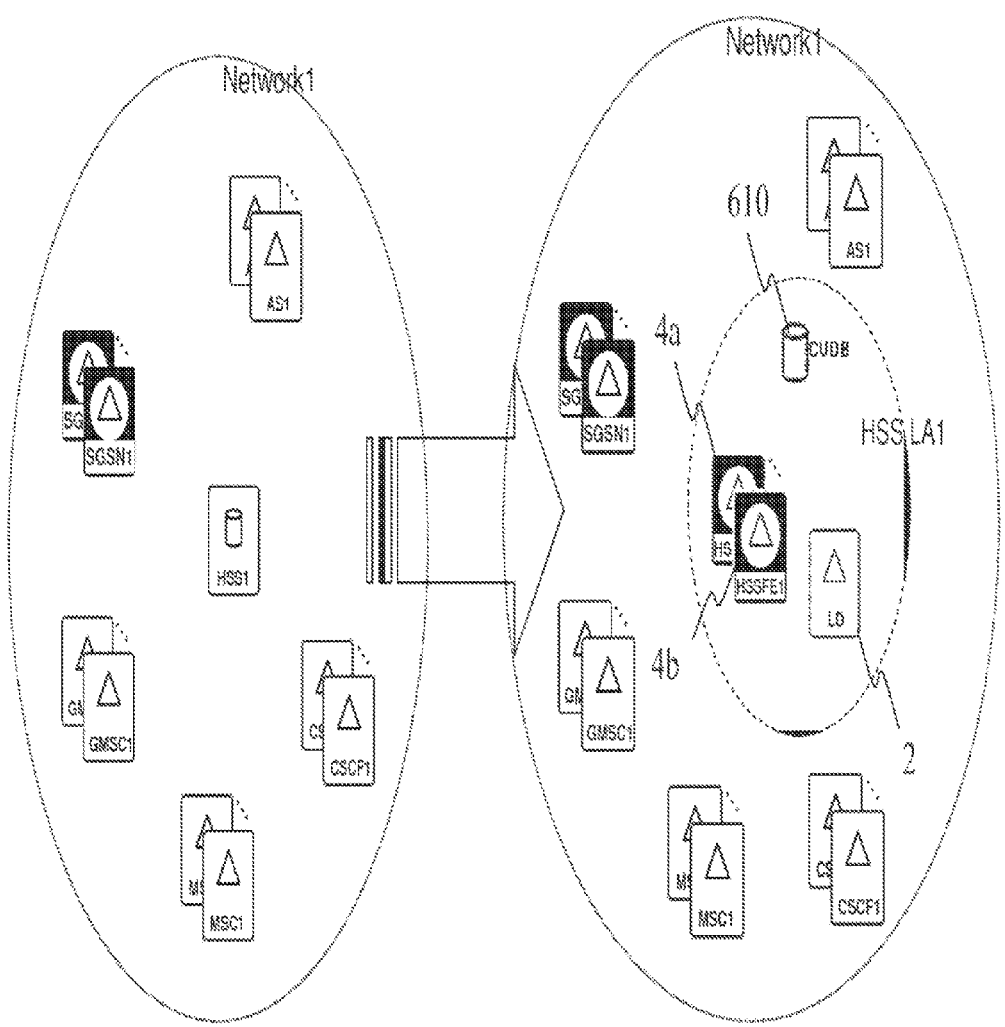
FIG. 7 schematically illustrates an example of conversion of a monolithic home subscriber server (HSS) into a home subscriber server (HSS) implemented in a layered architecture (LA) and including a message distributor or load distributor (LD) for illustrating an embodiment of the invention.

FIG. 7 shows the possible evolution from a monolithic home subscriber server (HSS) to a home subscriber server implemented in a layered architecture (HSS LA) to illustrate the underlying problems that the invention aims to solve. The evolution from a monolithic home subscriber server (HSS) to a home subscriber server implemented in a layered architecture (HSS LA) may be seen as the separation or decoupling of the business logic and the data logic (subscriber data).

The evolution from a monolithic home subscriber server (HSS) to a home subscriber server implemented in a layered architecture (HSS LA) may be seen as follows, from a network perspective. The substitution of each existing home subscriber server (HSS) in the network (left-hand side "Network 1" in FIG. 7) may be done:

In a 1:1 relation, wherein each monolithic home subscriber server (HSS) leads to one home subscriber server implemented in a layered architecture (HSS LA); or In a n:k relation, where n is the integer number of existing home subscriber server (HSS) nodes and k the integer number of substituting home subscriber server implemented in a layered architecture (HSS LA). k depends on the number of subscribers that the n nodes can support and the new layout the operator wants to have. For example, two existing home subscriber server (HSS) nodes may be substituted by either two different home subscriber servers implemented in a layered architecture (HSS LA) with n front ends 4a, 4b each, or by one single home subscriber server implemented in a layered architecture (HSS LA) with 2 times n front ends 4a, 4b.

Due to the physical deployment of a home subscriber server implemented in a layered architecture (HSS LA) and the dynamic allocation of subscribers, it may happen that a message distributor 2 or load distributor (LD) does not distribute the traffic among the pool of destination nodes 4a, 4b or home subscriber server front ends (HSS FE) in an efficient manner, from a distance and latency perspective. The new, distributed, layered architecture indeed introduces extra latency in comparison to monolithic home subscriber server (HSS) due to the communication amongst all nodes making up the home subscriber server (HSS LA).

For a first message in a transaction, a basic distribution may be performed inside the message distributor 2 or load distributor (LD) by means of a round-robin algorithm. Subsequent messages of that transaction are routed towards the same front end (FE) 4a, 4b to assure delivery of that subsequent messages to the same front end (FE or HSSFE).

This mechanism may be based on front end (FE) static capacity, performing the round-robin according to the actual front end (FE) processing capacity (weighted round-robin). For example, a front end using a dual socket 1.3 GHz Itanium-2 processor has not the same capacity than another one based on a AMD Second-Generation Opteron 1210 1.8 GHz. The more powerful a front end 4a, 4b is, the more traffic it will proportionally handle.

In the event that the network is modified by adding/removing a front end 4a, 4b, if the method of the invention is not used, some manual routing configuration would be required to take into account the new front end (FE) 4a, its capacity and the altered situation within the whole architecture.

In addition, a constraint of the approach results from the distance associated to the geographical distribution of the front ends 4a, 4b. This may lead to high global latencies. The possible overload of the inter-site network is also a problem when the message distributor 2 performs such distribution. The method of the invention aims to solve these problems.

Figure 8:
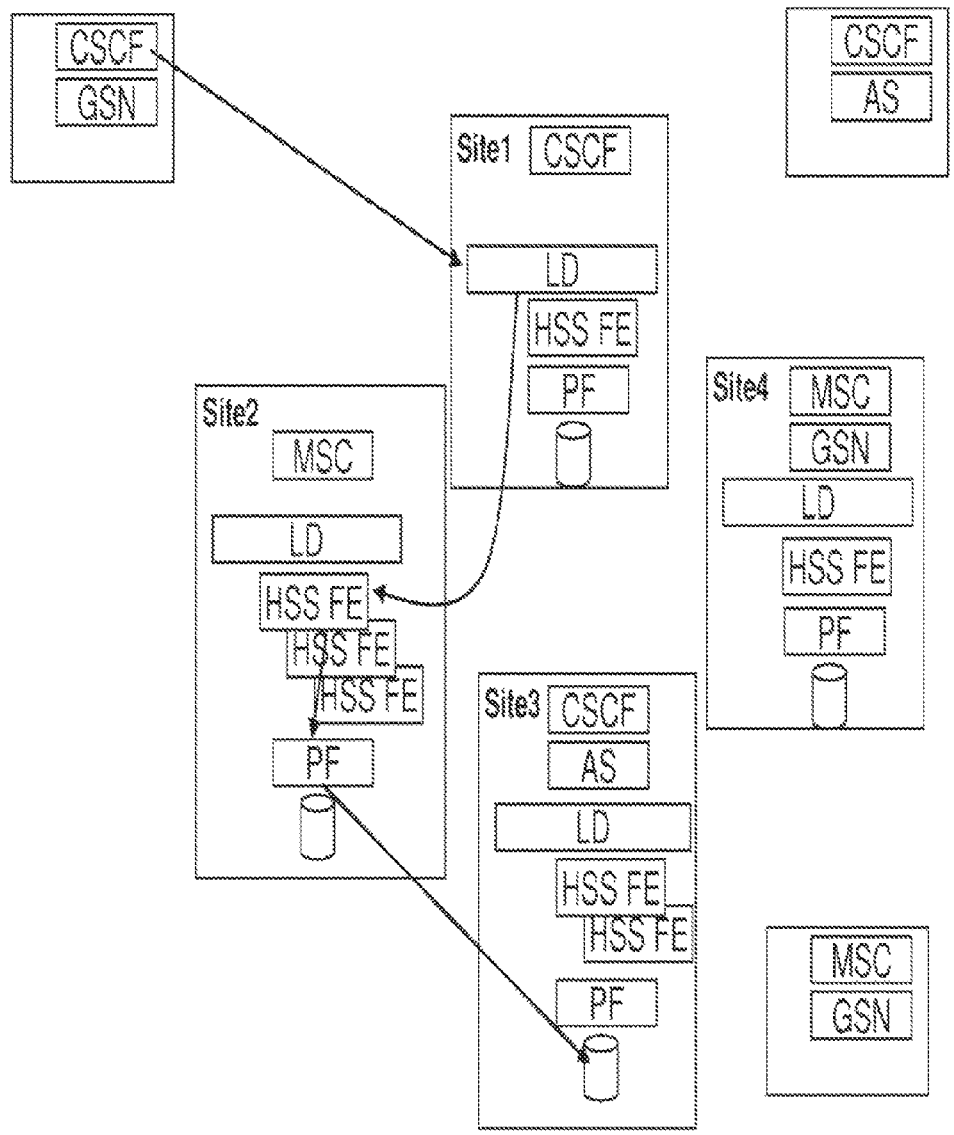
FIG. 8 schematically illustrates a network situation considered to be undesirable, presented herewith for explaining the technical problems that the invention aims to solve.

FIG. 8 illustrates a possible undesirable deployment of message flow to help further illustrating the underlying problems that the invention aims to solve. It shows an example of the possible deployment of a home subscriber server arranged in a layered architecture (HSS LA) and a resulting message flow.

The problems are as follows:

1. Manual configuration is needed when introducing/removing a front end (HSS-FE) 4a, 4b in the home subscriber server implemented in a layered architecture (HSS LA). This results for the need to not only create or delete routes between message distributors 2 or load distributors (LD) and such front ends (HSS-FE) 4a, 4b but also to reconfigure distribution rules in all message distributors 2 or load distributors (LD), due to the possible capacity difference between the front ends (FEs) 4a, 4b.

2. Since the existing distribution is not latency-based, in some cases, the message distributor 2 or load distributor (LD) and the destination nodes 4a, 4b, or home subscriber server front ends (HSS FE), are located in different sites and therefore the communication may introduce high latencies in the total message flow.

3. There may be inter-site communication when transferring messages from and to the message distributor 2 or load distributor (LD) to and from the destination nodes 4a, 4b or home subscriber server front ends (HSS FE). The intercommunication networks are highly loaded due to that traffic.

The method of the invention aims to solve these problems.

FIG. 9a illustrates an exemplary table that may be used to compute the destination weights in the destination weight computing procedure 16 in one embodiment of the method of the invention. Two rows are provided, namely a first row corresponding to a first latency metric category LMC1 and a second row corresponding to a second latency metric category LMC2. Two columns are provided, namely a first column corresponding to a first congestion metric category CMC1 and a second column corresponding to a second congestion metric category CMC2.

As shown, four destination weights $DW_{11}$, $DW_{12}$, $DW_{21}$, and $DW_{22}$ each correspond to one pair of a latency metric category and a congestion metric category.

The destination weight computing procedure 16 may consist in obtaining the destination weight $DW_{ij}$ corresponding to the row i and column j corresponding to the latency metric categories and the congestion metric categories, to which respectively the obtained latency metric values and congestion metric values are associated with. The categories may be ranges of metric values.

An example of resulting destination weights is illustrated in FIG. 9b.

Depending on the latency group and the current congestion level to which the front end 4a, 4b belongs, the front end 4a, 4b is assigned a destination weight in the destination weight computing procedure 16 used in the message distributor 2, in accordance with such a table.

The portion of total traffic sent to each destination node 4a, 4b follows the following formula:

Portion of *HSSFEx*_traffic=*HSSFEx*_weight/
 (*HSSFE*1_weight+ . . . +*HSSFEn*_weight)

wherein

HSSFEx weight is the configurable value obtained from the exemplary table of FIG. 9b depending on the current latency metric and congestion level metric associated with the destination node x.

Whenever a destination node 4a, 4b (HSS FE) is introduced or removed from the pool, or whenever the latency group or the congestion level associated with a destination node 4a, 4b (HSS FE) changes, the routing table is updated. Each of these situations provokes a new distribution pattern among the pool of destination nodes 4a, 4b (HSS FE).

The congestion levels may correspond to those defined in section 5.2 "Congestion-Level AVP" of IETF draft draft-asveren-dime-cong-02.txt (above referred).

The table of FIG. 9b is merely an example and the latency groups, the congestion level groups and the destination weights assigned to each pair may be different.

For example, let us assume the configuration illustrated in FIG. 10 is provided.

At a given moment in time, the situation may be:
 HSSFE1: Congestion Level 0 and Low latency
 HSSFE2: Congestion Level 0 and Medium latency
 HSSFE3: Congestion Level 0 and Medium latency
 HSSFE4: Congestion Level 0 and High latency In this situation and using the destination weights, congestion level categories and latency categories of the table of FIG. 9b, the traffic is distributed following this proportion:
 10/32 to HSSFE1,
 8/32 to HSSFE2,
 8/32 to HSSFE3, and
 6/32 to HSSFE4.

After a while, the situation may evolve to this one, mainly because HSSFE1 is the preferred front end (FE) and becomes congested sooner than the other FEs:

HSSFE1: Congestion Level 2 and Low latency
HSSFE2: Congestion Level 1 and Medium latency
HSSFE3: Congestion Level 1 and Medium latency
HSSFE4: Congestion Level 0 and High latency As a result, the way the traffic is distributed is reconfigured and follows the new proportion after computation in the destination weight computing procedure 16:

8/30 to HSSFE1,
8/30 to HSSFE2,
8/30 to HSSFE3, and
6/30 to HSSFE4.

In one embodiment, after a distribution pattern is set, the messages are distributed applying these rules: All destination nodes 4a, 4b (HSS FE) are placed in a nested chain: HSSFE1, HSSFE2, . . . , HSSFEn and then, HSSFE1 again. Initially all traffic portion is sent to the first destination node 4a, 4b (HSSFE). Afterwards, all the traffic portion belonging to next destination node 4a, 4b (HSSFE) in the chain is sent and this process continues until the last destination node 4a, 4b (HSSFE). Once traffic portion HSSFEn is sent, the process continues starting in HSSFE1.

In one embodiment, whenever a reconfiguration of the distribution pattern occurs, the distribution process is initiated in the next destination node 4a, 4b (HSSFE) to the one which provoked the reconfiguration.

This invention is not however limited to this distribution scheme.

The above examples show how the automatic reconfiguration of the table of the message distributor 2 or load distributor (LD) takes place. Now, examples of applications of the method according to one embodiment of the invention will be illustrated by reference to FIG. 11, 12, 13, starting from the following initial situation:

HSSFE1: Congestion Level 5 and Low latency
HSSFE2: Congestion. Level 3 and Medium latency
HSSFE3: Congestion Level 5 and Medium latency
HSSFE4: Congestion Level 1 and High latency In this situation, the traffic is distributed following this proportion:

6/22 to HSSFE1,
6/22 to HSSFE2,
4/22 to HSSFE3, and
6/22 to HSSFE4.

Figure 11:
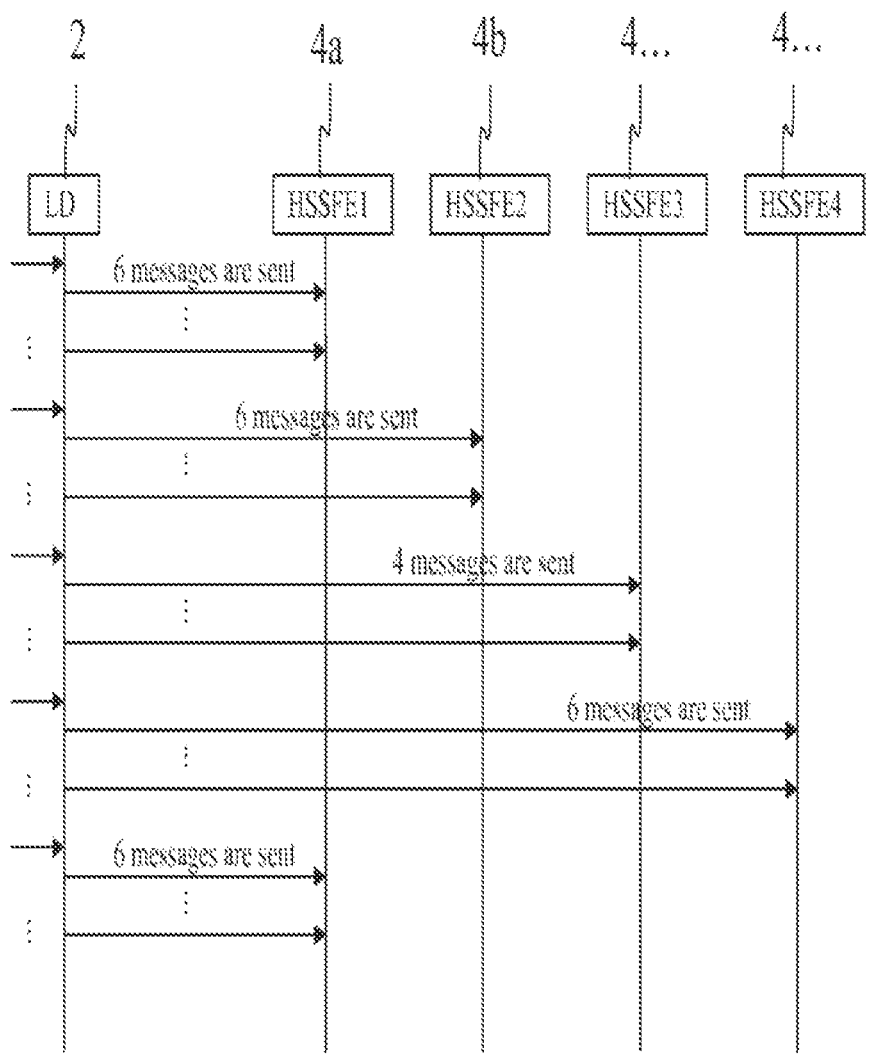
FIG. 11 shows a message graph according to one embodiment of the invention, wherein a normal message distribution without disturbance is depicted.
Figure 12:
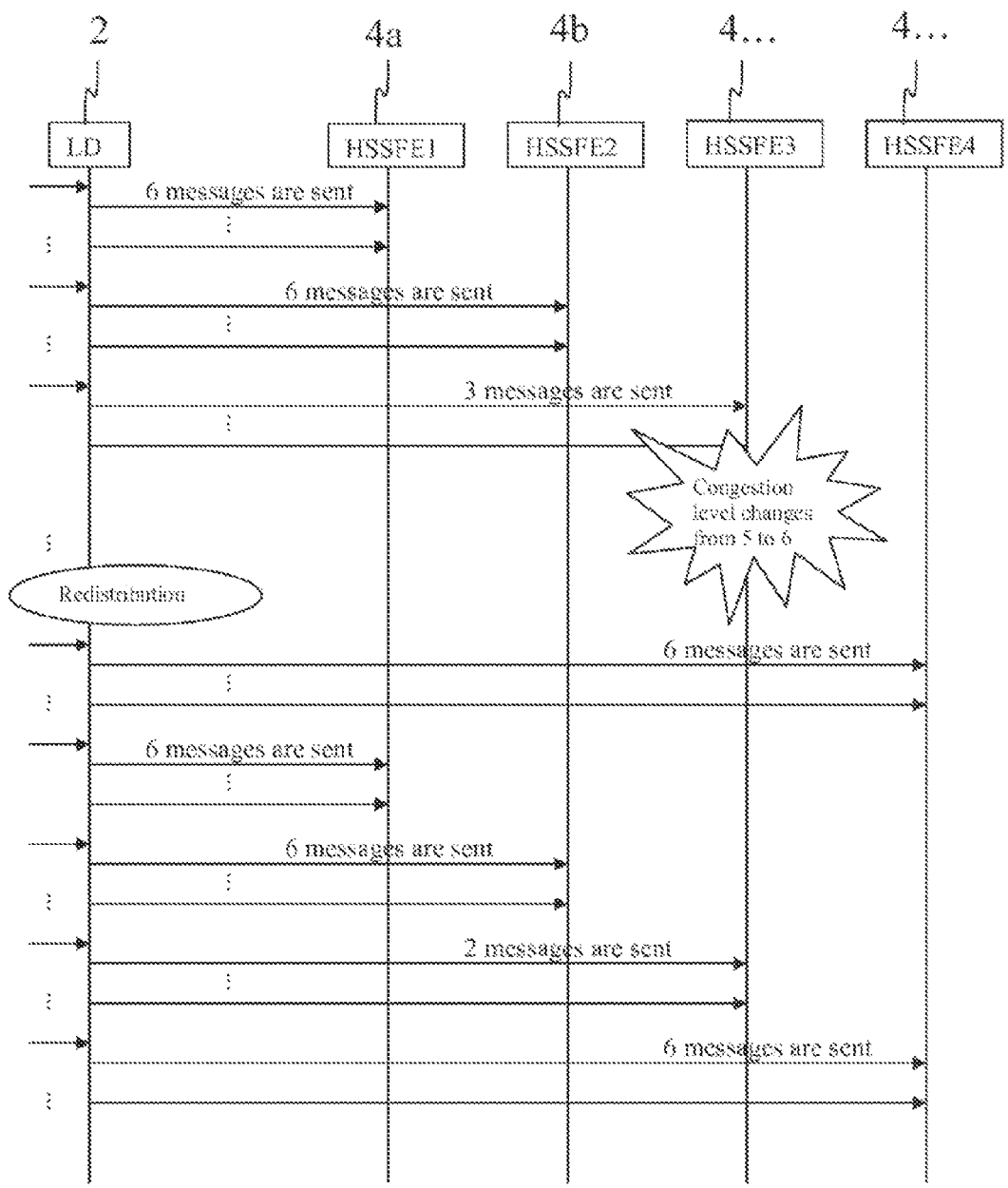
FIG. 12 shows another message graph according to one embodiment of the invention, wherein a change in congestion metric category occurs with respect to one destination node.
Figure 13:
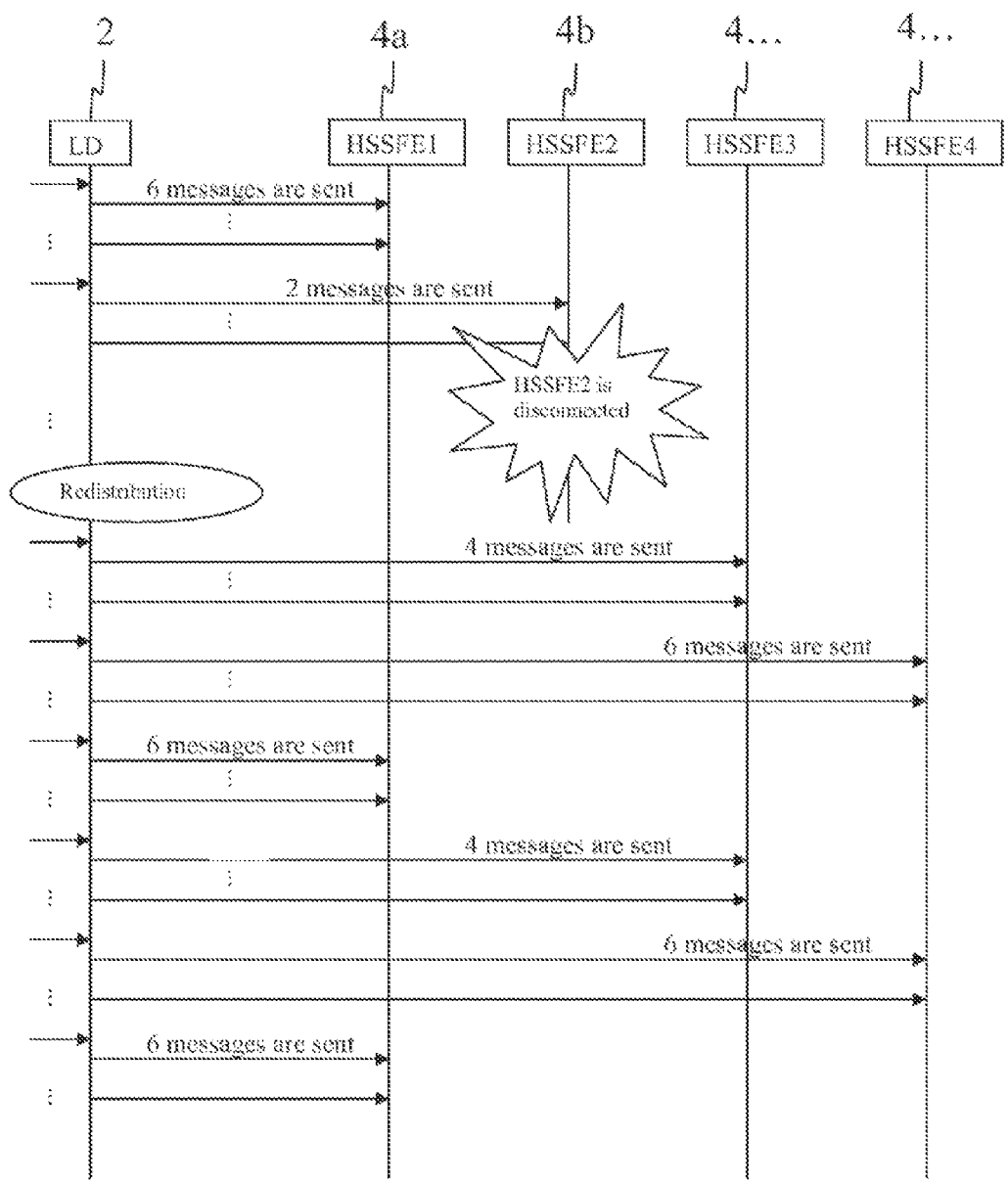
FIG. 13 shows yet another message graph according to one embodiment of the invention, wherein a disconnection of a destination node is depicted.

For the sake of clarity, neither subsequent messages belonging to the same transaction nor answer messages are included in the message graphs of FIGS. 11, 12, and 13.

FIG. 11 shows a normal distribution without any disturbance, following the established pattern.

FIG. 12 shows the distribution after a distribution pattern change due to change in congestion level. After the third message out of four is sent to the front end HSSFE3, the congestion level associated with that front end is changed to 6. Therefore, the distribution pattern changes and a new distribution pattern is initiated starting in front end HSSFE4.

The new distribution pattern after the HSSFE congestion level change is as follows:

6/20 to HSSFE1,
6/20 to HSSFE2,
2/20 to HSSFE3, and
6/20 to HSSFE4.

FIG. 13 shows the distribution after a distribution pattern change due to a front end (HSSFE) disconnection.

After the second message out of six is sent to the front end HSSFE2, this front end (HSSFE) is disconnected. Therefore, the distribution pattern changes and a new distribution pattern is initiated starting in front end HSSFE3. The new distribution pattern after the disconnection of front end HSSFE2 is as follows:

6/16 to HSSFE1,
4/16 to HSSFE3, and
6/16 to HSSFE4.

Figure 14A:
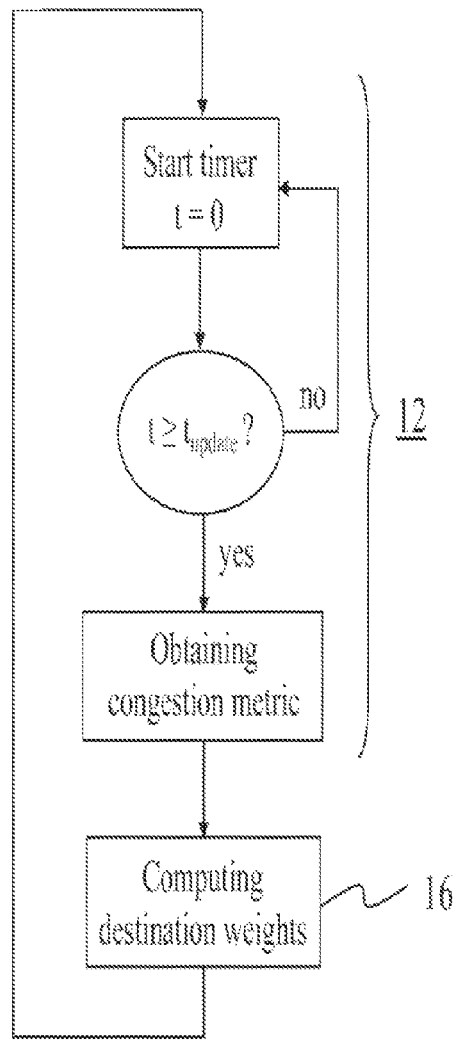
FIGS. 14a and 14b show flow charts of a congestion metric obtaining procedure and a destination weight computing procedure according to embodiments of the invention.
Figure 14B:
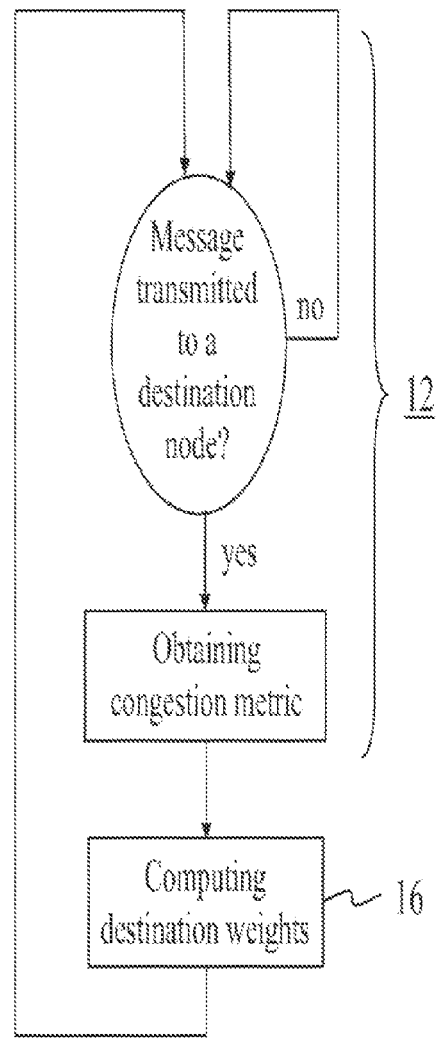

FIGS. 14a and 14b illustrate two embodiments of the congestion metric obtaining procedure 12 and the destination weight computing procedure 16 according to the invention.

In FIG. 14a, a timer is started ("t=0") and, when a timing value $t_{update}$ is reached ("t≥$t_{update}$", yes), the congestion metric is obtained, followed by the computing of the destination weights 16. Thereafter, the timer is restarted ("t=0").

Figure 15A:
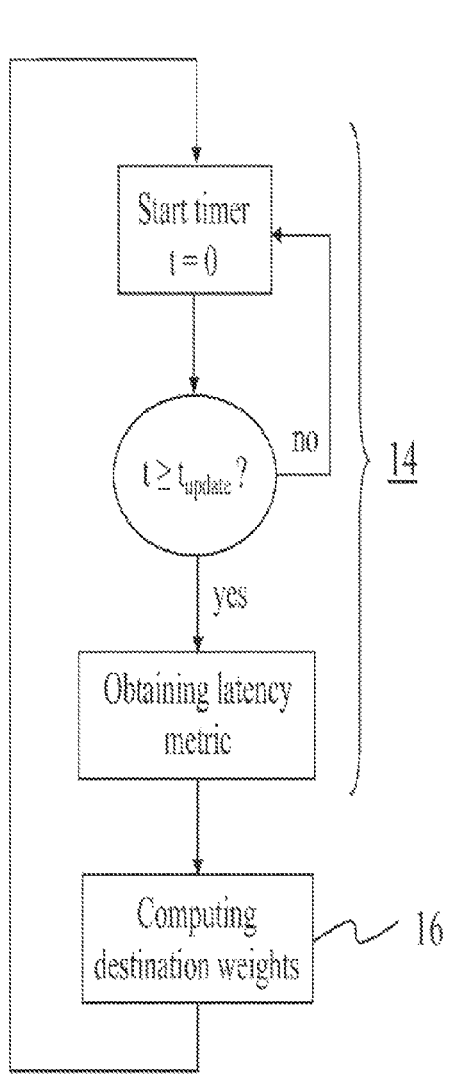
FIGS. 15a and 15b show a latency metric obtaining procedure and a destination weight computing procedure according to embodiments of the invention.

FIG. 14b illustrates that, when a message is transmitted to a destination node ("yes"), the congestion metric is obtained and, thereafter, the destination weights are computed 16. Afterwards, the message distributor 2, and more particularly the congestion metric obtaining unit 502 starts waiting again (e.g., listening) for a message to be transmitted to a destination node 4a, 4b In FIG. 15a, a timer is started ("t=0") and, when a timing value $t_{update}$ is reached ("t≥$t_{update}$", yes), the latency metric is obtained, followed by the computing of the destination weights 16. Thereafter, the timer is restarted ("t=0").

Figure 15B:
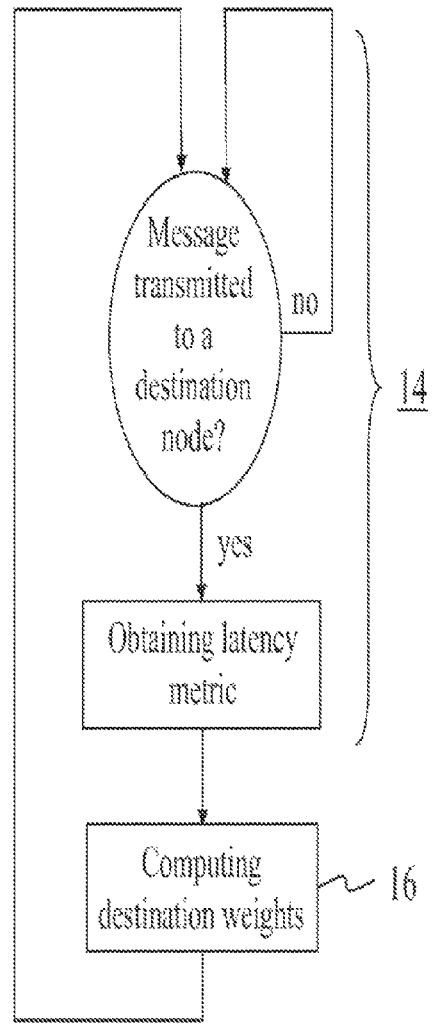

FIG. 15b illustrates that, when a message is transmitted to a destination node ("yes"), the latency metric is obtained and, thereafter, the destination weights are computed 16. Afterwards, the message distributor 2, and more particularly the latency metric obtaining unit 504 starts waiting again (e.g., listening) for a message to be transmitted to a destination node 4a, 4b.

Figure 16:
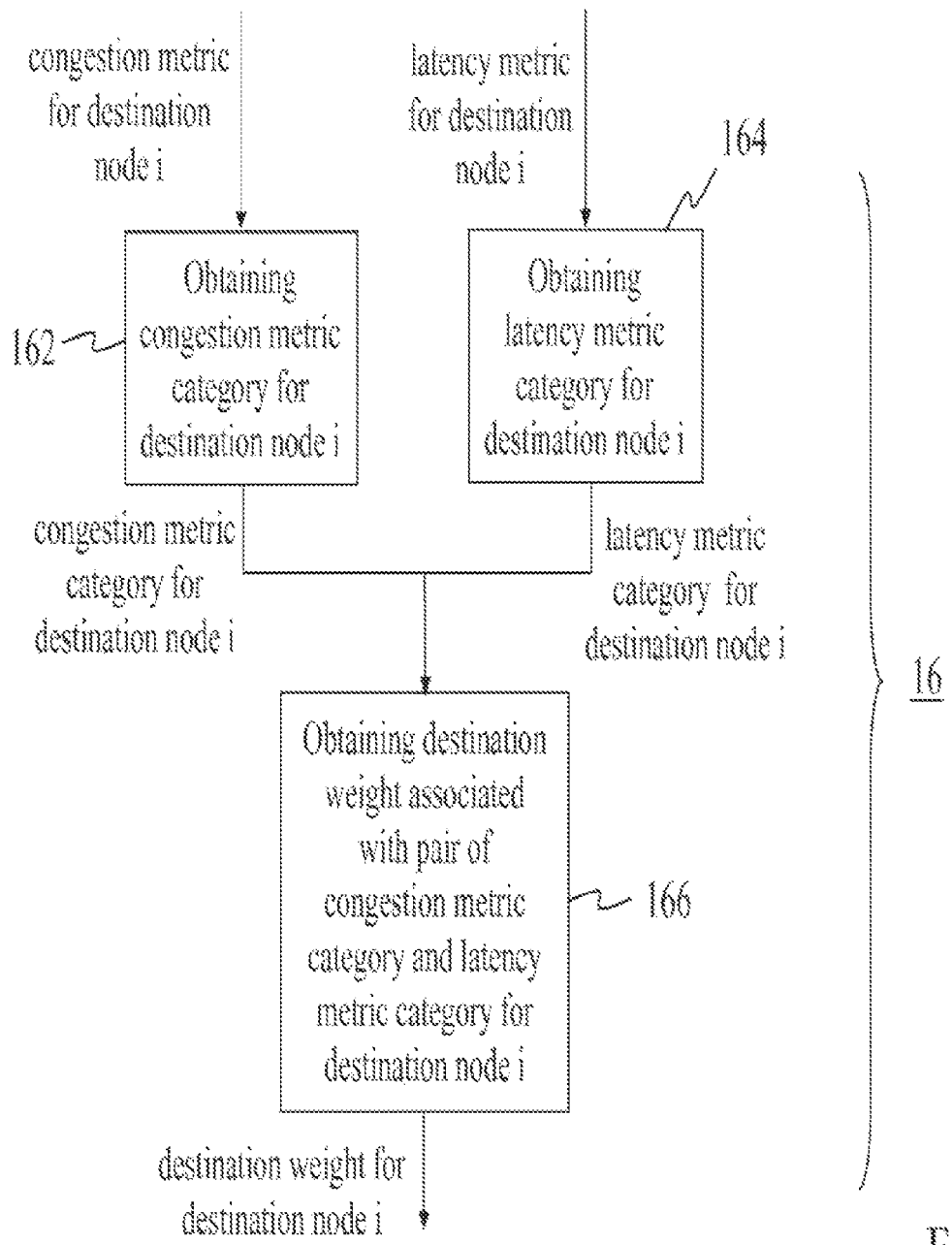
FIG. 16 show a flow chart of a destination weight computing procedure according to one embodiment of the invention.

FIG. 16 illustrates an embodiment of the destination weight computing procedure 16 according to the invention. The procedure includes a step 162 of obtaining a congestion metric category for the destination node i and a step 164 of obtaining a latency metric category for the same destination node i. Based on the congestion metric category and the latency metric category for the destination node i, the destination weight associated with the pair of congestion metric category and latency metric category for the node i is obtained in step 166.

The physical entities of the system according to the invention, including the message distributor 2 and the destination nodes 4a, 4b may comprise or store computer programs including instructions such that, when the computer programs are executed on the physical entities, steps and procedures according to one embodiment of the invention are carried out. The invention also relates to such computer programs for carrying out methods according to the invention, and to any computer-readable medium storing the computer programs for carrying out methods according to the invention.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A method for distributing messages received by a message distributor to at least two destination nodes, comprising:
a congestion metric obtaining procedure for obtaining a congestion metric of each of the at least two destination nodes, wherein at least two congestion metric categories are provided and each congestion metric value is associated with one congestion metric category;

a latency metric obtaining procedure for obtaining a latency metric of each of the at least two destination nodes, wherein the latency metric of a destination node includes a measure of a transmission time between the message distributor and the destination node, and wherein at least two latency metric categories are provided and each latency metric value is associated with one latency metric category;

a destination weight computing procedure for computing, destination weights of each of the at least two destination nodes by taking into account the congestion metric and the latency metric of each of the at least two destination nodes, wherein a destination weight is associated with each pair of a congestion metric category and a latency metric category; and wherein the destination weight computing procedure includes obtaining the congestion metric category with which the congestion metric of each of the at least two destination nodes is associated;

obtaining the latency metric category with which the latency metric of each of the at least two destination nodes is associated; and obtaining for each of the at least two destination nodes the destination weight associated with its pair of congestion metric category and latency metric category; and a destination node selecting procedure for selecting, by the message distributor, as a destination for a received message one of the at least two destination nodes, depending at least on the destination weights.

2. The method of claim 1, wherein the measure of the transmission time between the message distributor and the destination node is a round-trip time.

3. The method of claim 2, wherein the latency metric of a destination node is a smoothed round-trip time.

4. The method of claim 1, wherein the latency metric of a destination node is a one-way time.

5. The method according to claim 1, wherein the congestion metric obtaining procedure includes monitoring the congestion metric of each of the at least two destination nodes in a periodical manner or when transmitting a message to a destination node, and the destination weight computing procedure includes computing the destination weights when any one of the congestion metrics changes.

6. The method according to claim 1, wherein the latency metric obtaining procedure includes monitoring the latency of each of the at least two destination nodes in a periodical manner or when transmitting a message to a destination node, and the destination weight computing procedure includes computing the destination weights when any one of latency metrics changes.

7. The method according to any one of the preceding claims, wherein the destination node selecting procedure includes selecting each of the at least two destination nodes in turn a number of times depending on its destination weight.

8. The method of claim 7, wherein the destination node selecting procedure includes selecting each of the at least two destination nodes in turn a number of times proportional to its destination weight.

9. A message distributor configured for receiving messages and for distributing them to at least two destination nodes, including a congestion metric obtaining unit configured for obtaining a congestion metric of each of the at least two destination nodes, wherein at least two congestion metric categories are provided and each congestion metric value is associated with one congestion metric category;

a latency metric obtaining unit configured for obtaining a latency metric of each of the at least two destination nodes, wherein the latency metric of a destination node includes a measure of a transmission time between the message distributor and the destination node, and wherein at least two latency metric categories are provided and each latency metric value is associated with one latency metric category;

a destination weight computing unit configured for computing destination weights of each of the at least two destination nodes by taking into account the congestion metric and the latency metric of each of the at least two destination nodes, wherein a destination weight is associated with each pair of a congestion metric category and a latency metric category;

wherein the destination weight computing unit is further configured for obtaining the congestion metric category with which the congestion metric of each of the at least two destination nodes is associated;

obtaining the latency metric category with which the latency metric of each of the at least two destination nodes is associated; and obtaining for each of the at least two destination nodes the destination weight associated with its pair of congestion metric category and latency metric category; and a destination node selecting unit configured for selecting as a destination for a received message one of the at least two destination nodes, depending at least on the destination weights.

10. The message distributor of claim 9, wherein the measure of the transmission time between the message distributor and the destination node is a round-trip time.

11. The message distributor of claim 10, wherein the latency metric of a destination node is a smoothed round-trip time.

12. The message distributor of claim 9, wherein the latency metric of a destination node is a one-way time.

13. The message distributor according to claim 9, wherein the congestion metric obtaining unit is further configured for monitoring the congestion metric of each of the at least two destination nodes in a periodical manner or when transmitting a message to a destination node, and the destination weight computing unit is further configured for computing the destination weights when any one of the congestion metrics changes.

14. The message distributor according to claim 9, wherein the latency metric obtaining unit is further configured for monitoring the latency of each of the at least two destination nodes in a periodical manner or when transmitting a message to a destination node, and the destination weight computing unit is further configured for computing the destination weights when any one of latency metrics changes.

15. The message distributor according to any one of claims 9 to 14, wherein the destination node selecting unit is further configured for selecting each of the at least two destination nodes in turn a number of times depending on its destination weight.

16. The message distributor of claim 15, wherein the destination node selecting unit is further configured for selecting each of the at least two destination nodes in turn a number of times proportional to its destination weight.

* * * * *